United States Patent [19]
Tanaka

[11] Patent Number: 5,905,245
[45] Date of Patent: May 18, 1999

[54] IC CARD READING/WRITING APPARATUS AND AN IC CARD SYSTEM

[75] Inventor: Hiroshi Tanaka, Kawasaki, Japan

[73] Assignee: Fujitsu Limited, Kawasaki, Japan

[21] Appl. No.: 08/728,857

[22] Filed: Oct. 10, 1996

[30] Foreign Application Priority Data

Dec. 21, 1995 [JP] Japan .................................. 7-333038

[51] Int. Cl.⁶ .................................................. G06F 17/00
[52] U.S. Cl. .......................... 235/375; 235/380; 902/26; 902/31
[58] Field of Search ................................... 235/375, 379, 235/380, 381, 383, 384; 902/25, 26, 31

[56] References Cited

U.S. PATENT DOCUMENTS

| 4,804,825 | 2/1989 | Bitoh | 235/380 |
| 4,961,142 | 10/1990 | Elliott et al. | 235/380 X |
| 5,036,461 | 7/1991 | Elliott et al. | 235/380 X |
| 5,038,025 | 8/1991 | Kodera | 235/492 |
| 5,064,999 | 11/1991 | Okamoto et al. | 235/380 X |
| 5,120,939 | 6/1992 | Claus et al. | 235/492 X |
| 5,313,052 | 5/1994 | Watanabe et al. | 235/375 |
| 5,321,395 | 6/1994 | Van Santbrink | 235/380 X |
| 5,382,778 | 1/1995 | Takahira et al. | 235/492 X |
| 5,418,353 | 5/1995 | Katayama et al. | 235/492 X |
| 5,451,763 | 9/1995 | Pickett et al. | 235/492 |
| 5,459,304 | 10/1995 | Eisenmann | 235/492 X |
| 5,471,669 | 11/1995 | Lidman | 902/25 X |
| 5,473,143 | 12/1995 | Vak et al. | 235/375 X |
| 5,555,497 | 9/1996 | Holbling | 235/375 X |
| 5,623,547 | 4/1997 | Jones et al. | 235/380 X |
| 5,635,703 | 6/1997 | Tanaka | 235/380 X |
| 5,670,772 | 9/1997 | Goto | 235/492 X |
| 5,682,027 | 10/1997 | Bertina et al. | 235/380 |

FOREIGN PATENT DOCUMENTS 4-190469  7/1992  Japan .
6-150076  5/1994  Japan .

Primary Examiner—Michael G. Lee
Attorney, Agent, or Firm—Staas & Halsey

[57] ABSTRACT

An IC card reading/writing apparatus has an IC card reading/writing control unit having an intelligent function to control read-out/write-in processing for an IC card by an application unit in the IC card reading/writing apparatus. The IC card reading/writing control unit has, in addition to the intelligent function, a pass-through function to control read-out/write-in processing for the IC card by an application unit in a host for the IC card reading/writing apparatus by receiving a pass-through command from the host. With this arrangement, the IC card reading/writing apparatus can execute readout/write-in processing for the IC card with either the intelligent function or the pass-through function, thereby minimizing the cost required to configure an IC card system.

5 Claims, 20 Drawing Sheets

FIG. 5(b) APPLICATION COMMAND

FIG. 5(c) R/W CONTROL COMMAND

FIG. 5(d) PASS-THROUGH COMMAND

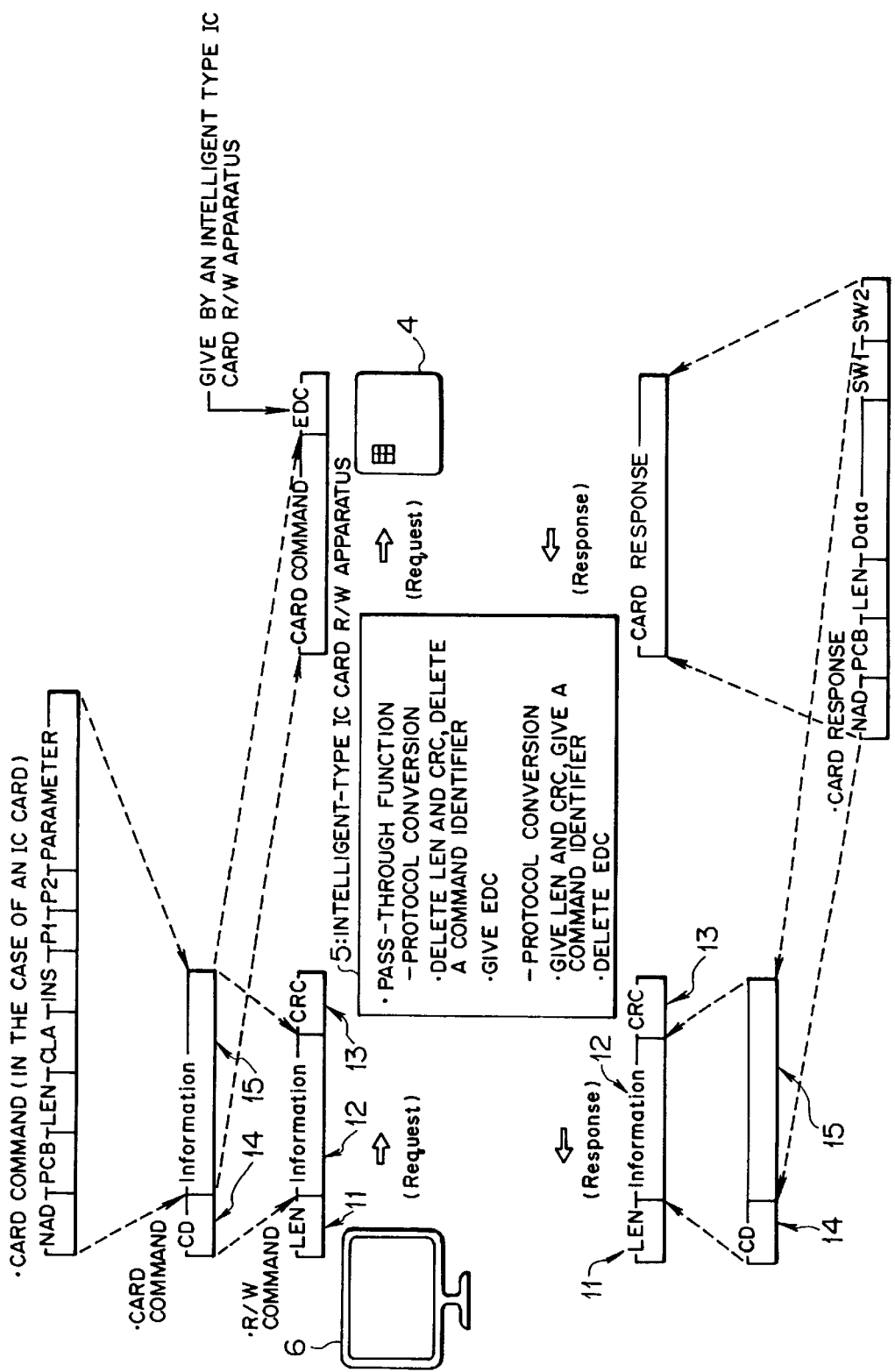

IC CARD READING/WRITING APPARATUS AND AN IC CARD SYSTEM

BACKGROUND OF THE INVENTION

1. Field of the Invention

The present invention relates to an IC card (smart card) reading/writing apparatus and an IC card system. In particular, the present invention relates to an IC card reading/writing apparatus having both an intelligent function and a pass-through function, and an IC card system using the IC card reading/writing apparatus.

2. Description of the Related Art

There is a tendency recently to distribute processes (functions) in a system in order to reduce the burden on a host system from terminals or the like. In a card system using an I (Integrated Circuit) card, an intelligent-type IC card reading/writing (R/W: Reader/Writer) apparatus is used. Such apparatuses having a so-called intelligent function, in which an application is built to process the card data first instead of the host system like a personal computer, are spreading.

FIG. 14 is a diagram showing an example of a general IC card system. In FIG. 14, reference numeral 101 denotes an IC card, reference numeral 102 denotes an IC card reading/writing (R/W) apparatus (equipment), and reference numeral 103 denotes an intelligent-type IC card R/W apparatus. Reference numerals 104 and 105 denote a personal computer and a printing apparatus of which a host system of the IC card R/W apparatus 102 and 103 consist.

The IC card R/W apparatus 102 has a so-called pass-through function to control read-out/write-in processing for the IC card 101 by an application on the personal computer 104. The IC card R/W apparatus 102 has, for example, a communication control unit ak, a mechanism control unit 102b, a mechanism unit 102c and an IC card commands processing unit 102d, as shown in FIG. 15. Also, reference numeral 104a in the personal computer 104 denotes an application unit.

The communication control unit 102a identifies a type of a R/W command (an R/W control command, an IC card command and so on, described later) received from the personal computer 104 to control a communication (transmission/reception of a command/response) with the IC card 101 according to a result of the identification. The mechanism control unit 102b transmits an instruction to insert (i.e., "fetch") or discharge the IC card 101 to the mechanism unit 102c if the type of the R/W command accepted through the communication control unit 102a is a R/W control command, which instructs to insert/discharge the IC card 101.

The mechanism unit 102c drives a motor or the like according to the instruction to insert/discharge the IC card 101 from the mechanism control unit 102b so as to insert/discharge the IC card 101. The IC card command processing unit 102d transmits a card command to get card data of the IC card 101 described later if a type of the R/W command received by the communication control unit 102a is an IC card command. Unit 102d transmits a response (including data from the IC card 101) thereto to the personal computer 6. Using this function (the pass-through function), the application unit 104a of the personal computer 104 can directly process the card data (a reading/writing process) in the IC card 101.

With the above structure, the above-mentioned IC card R/W apparatus 102 performs an inserting/discharging process on the IC card 101 according to an instruction from the upper system (the personal computer 104 or the like). In addition, the IC card command processing unit 102d transfers the card data of the inserted IC card 101 as a response to the host system. In this manner, the application (the application unit 104a of the personal computer 104) of the host system directly performs a reading/writing process (a card data process) on the IC card 101.

The operation of the above-mentioned IC card system can be described as the following with reference to the flowchart (Steps A1 through A8) shown in FIG. 16.

When the power source for the IC card R/W apparatus 102 is switched on, the IC card R/W apparatus 102 comes to a state of waiting for a command from the host system (NO route at Step A1). If the R/W command, for example, is transmitted from the personal computer 104 (Step A2) and the IC card R/W apparatus 102 receives this R/W command (if a decision at Step A1 is YES), the IC card R/W apparatus 102 checks whether the type of the received R/W command is the R/W control command or the IC card command (Steps A3 and A4).

If the received R/W command is an R/W control command (if a decision at Step A3 is YES), the mechanism control unit 102b of the IC card R/W apparatus 102 controls the mechanism unit 102c to drive a motor to insert/discharge the IC card 101 (Step A5). Then the IC card R/W apparatus 102 transmits a command response to the R/W control command, which shows the process completed normally, to the personal computer 104 (Step A8).

If the command from the personal computer 104 is an IC card command (if a decision at Step A3 is NO and at Step A4 is YES), the communication control unit 102a and the IC card command processing unit 102d of the IC card R/W apparatus 102 perform an IC card command process on the IC card 101 as the follows. The IC card R/W apparatus 102 converts the communication protocol of the card command to instruct reading/writing processing for the IC card 101, the instructed processing being adapted to the IC card 101, and transmits the card command to the IC card 101. Further, the IC card R/W apparatus 102 receives a response (a card response) to the transmitted card command. Apparatus 102 converts the communication protocol of this card response (including the card data of the IC card 101) into the original communication protocol adapted to the personal computer 104 (Step A6).

The IC card R/W apparatus 102 then transmits a command response to the R/W control command, which shows the process was completed normally, to the personal computer 104 (Step A8). In the personal computer 104, having received this command response, the application unit 104a performs a data process on the card data of the IC card 101 transmitted as the response. That is, in the IC card R/W apparatus 102, the writing/reading process on the IC card 101 is directly performed, not by the IC card R/W apparatus 102 itself, but rather by the application unit 104a of the personal computer 104.

If the R/W command received from the personal computer 104 at Step A1 is neither a R/W control command nor an IC card command (if decisions at both Steps A3 and A4 are NO), the IC card R/W apparatus 102 generates an error response (Step A7). Apparatus 102 then transmits this response to the personal computer 104 to notify the received command is not normal (Step A8).

In FIG. 14, an intelligent-type IC card R/W apparatus 103 has a built-in application. By this application, a primary process on card data of the IC card 101 can be independently performed by the IC card R/W apparatus itself. The intelligent-type IC card R/W apparatus 103 has, for example, a communication control unit 103a, an application unit 103b, a mechanism control unit 103c an a mechanism unit 103d, as shown in FIG. 17.

The communication unit 103a controls the communication of a R/W command from the personal computer 104 (i.e., the application unit 104a therein) or the application unit 103b. The application unit 103b identifies the type of the R/W command from the personal computer 104, and executes an application processing. The application processing is to fetch (insert/discharge) the IC card, convert a communication protocol for the IC card 101, generate/transmit a card command, or the like, according to the result of the identification. The mechanism control unit 103c controls a motor or the like of the mechanism unit 103d when the application unit 103b identifies the type of the R/W command as an R/W control command to insert/discharge the IC card 101.

The above-mentioned R/W command has a format consisting of, for example, a header unit 106, an information unit 107 and a trailer unit (CRC) 108 and the like, as shown in FIG. 18. In the header unit 106, a length LEN (bytes) of the information unit 107 is stored. In the information unit 107, a RAN command identifier (for example, "AP" in the case of an application command) 109, a command unit 110 and the like are stored. The IC card R/W apparatus 103 can determine whether a received R/W command is an application command or not based on the R/W command identifier 109.

A process in the intelligent-type IC card R/W apparatus 103 with the above structure can be described in detail through the following with reference to the flowchart (Steps B1 through B8) shown in FIG. 19.

When the IC card R/W apparatus 103 is activated (when a power source is switched on), the IC card R/W apparatus 103 comes to a command reception waiting state (NO route at Step B1). If the application unit 104a of the personal computer 104 transmits any command (the R/W command, for example), (Step B2) and the IC card R/W apparatus 103 receives this R/W command. The IC card R/W apparatus 103 determines whether this R/W command is an application command or not based on the R/W command identifier 109 (refer to FIG. 18) stored in the R/W command (Step B3).

If the received R/W command is an application command (if the decision at Step B3 is YES), the IC card R/W apparatus 103 further determines whether this R/W command is a R/W control command to instruct to insert/discharge the IC card 101 or not (Step B4). If the R/W command is a R/W control command (if a decision at Step B4 is YES), the mechanism control unit 103c controls the mechanism unit 103d to insert/discharge the IC card 101 (Step B5). The IC card R/W apparatus 103 then transmits a command response to the received R/W command (the application command) which shows the process completed normally to the personal computer 104 (Step B8).

If the received R/W command is not a R/W control command (if the decision at Step B4 is NO), the application unit 103b of the IC card R/W apparatus 103 performs application processes. These application processes are such as generating and transmitting a card command to the IC card 101, receiving a card response from the IC card 101, a card data process, and generating a command response to the personal computer 104 (Step B6). Application unit 103b then transmits the generated command response to the personal computer 104 (Step B8).

If the received R/W command is not an application command (if a decision at Step B3 is NO), the communication control unit 103a of the IC card R/W apparatus 103 generates an error response (Step B7). The communication control unit 103a then transmits this error response to the personal computer 104 so as to notify that the process in response to the received R/W command could not be normally performed (Step B8).

In the intelligent-type IC card R/W apparatus 103 described above, the built-in application unit 103b is controlled according to an application command from the host apparatus such as the personal computer 104. An application process by the application unit 103b enables a primary process on card data.

There is another type of the intelligent-type IC card R/W apparatus 103. When this type of IC card R/W apparatus 103 is activated, the built-in application unit 103b is automatically activated. When the IC card 101 is inserted, the application unit 103b performs a primary process on card data of the IC card 101 by the application process described above, without a command from the personal computer 104.

In this case, when the IC card R/W apparatus 103 is activated as shown in FIG. 20, for example, the IC card R/W apparatus 103 first automatically activates the application unit 103b in itself and comes to a state of waiting for the IC card 101 to be inserted (NO route at Step C1). When the IC card 101 is inserted (if a decision at Step C1 is YES), the application unit 103b transmits the R/W control command to the mechanism control unit 103c (Step C2). The mechanism control unit 103c then controls the mechanism unit 103d to fetch the IC card 101.

Subsequently, the application unit 103b of the IC card R/W apparatus 103 performs a card accessing process. This is a process such as generating and transmitting a card command to the inserted IC card 101, or receiving a card response from the IC card 101 (Step C3). Application unit 103b then executes a card data process such as editing card data of the IC card 101 (Step C4).

When the card data process is terminated in the IC card R/W apparatus 103, the application unit 103b transmits a R/W control command to instruct to discharge the IC card 101 to the mechanism control unit 103c (Step C5). The mechanism control unit 103c controls the mechanism unit 103d to discharge the IC card 101 (Step C6).

If the IC card R/W apparatus receives a command to require data of the IC card 101, after having finished the card data process from the personal computer 104 but while the process as above is being executed (Step C7), for example, the IC card R/W apparatus 103 executes a communication interrupting process as follows.

The IC card R/W apparatus 103 first inhibits an interruption which is caused by accepting a command from another host system (Step C8). The IC card R/W apparatus 103 then edits card data of the IC card 101 after having finished the data process (Step C9) and transmits it to the personal computer 104 as a command response (Steps C10 and C11). Apparatus 103 then permits an interruption from another host system (Step C12).

As an apparatus performing a reading/writing process on the IC card 101, there are, in general, provided the IC card R/W apparatus 102 and the IC card R/W apparatus 103. The apparatus 102 has a pass-through function to implement an operation (a card inserting/discharging, a data process, etc.) on the IC card 101 by the application unit 104a of the personal computer 104. The intelligent-type IC card R/W apparatus 103 has an application function to implement an operation on the IC card 101 by the application unit 103b built-in, as above.

However, each of the IC card R/W apparatus 102 and the above-mentioned intelligent-type IC card R/W apparatus 103 has only either one of the pass-through function or the application function. In consequence, it is impossible to use, for example, the intelligent type IC card R/W apparatus 103 as the IC card R/W apparatus 102 having the pass-through function.

A process such as directly accessing the IC card 101 from the personal computer 104 by the application unit 104a of the personal computer 104 may be desired (if the pass-through function is desired to be used) in an IC card system using the intelligent-type IC card R/W apparatus 103, for example. In such a case, it is necessary to newly connect the IC card R/W apparatus 102 having the pass-through function mentioned above to a host system such as the personal computer 104. This is quite disadvantageous in cost.

SUMMARY OF THE INVENTION

In the light of the above problem, an object of the present invention is to provide an IC card reading/writing apparatus and an IC card system, which can minimize the cost required to configure the IC card system by providing both the intelligent function and the pass-through function to the IC card reading/writing apparatus so that it is possible to perform a reading/writing process on an IC card with either function.

The present invention therefore provides an IC card reading/writing apparatus comprising an IC card reading/writing control unit having an intelligent function to control read-out/write-in processing for an IC card by an application unit in itself. The IC card reading/writing control unit has, in addition to the intelligent function, a pass-through function to control read-out/write-in processing for the IC card by an application unit in a host for an IC card reading/writing apparatus by receiving a pass-through command from the host.

The present invention also provides an IC card system comprising an IC card, an intelligent-type IC card reading/writing apparatus to execute read out/write-in processing for the IC card by an application unit in itself, and a host for the IC card reading/writing apparatus. The host is able to send a pass-through command to the IC card reading/writing apparatus. The IC card reading/writing apparatus includes an IC card reading/writing control unit having an intelligent function to control read-out/write-in processing for the IC card by an application unit in itself. The IC card reading/writing control unit has, in addition to the intelligent function, a pass-through function to control read-out/write-in processing for the IC card by an application unit in the host when receiving a pass-through command from the host.

According to the IC card reading/writing apparatus and the IC card system of this invention, one IC card reading/writing apparatus may be used as either an apparatus with the intelligent function or an apparatus with the pass-through function. It is therefore possible to simplify the configuration of the IC card system, largely reduce the cost required to build the system, and contribute to flexibility of the configuration of the system.

The present invention further provides an IC card reading/writing apparatus comprising an IC card reading/writing control unit having an intelligent function to control read-out/write-in processing for an IC card by an application unit in itself and a pass-through function to control read-out/write-in processing for the IC card by means of an application unit in a host for an IC card reading/writing apparatus by receiving a pass-through command from the host. The IC card reading/writing apparatus also includes an operation mode control unit for making the IC card reading/writing apparatus be in a selected state of either the intelligent function or the pass-through function in the IC card reading/writing control unit according to the operation mode set in response to the 5 operation mode command received from the host.

The present invention still further provides an IC card system comprising an IC card, an intelligent-type IC card reading/writing apparatus to execute readout/write-in processing for the IC card by an application unit in itself, and a host for an IC card reading/writing apparatus. The host is able to send a pass-through command to the IC card reading/writing apparatus. The IC card reading/writing apparatus includes an IC card reading/writing control unit having an intelligent function to control read-out/write-in processing for the IC card by an application unit in itself and a pass-through function to control read-out/write-in processing for the IC card by an application unit in the host by receiving a pass-through command from the host. The IC card reading/writing apparatus further includes an operation mode control unit for making the IC card reading/writing apparatus be in a state of either the intelligent function or the pass-through function in advance according to a setting command to select the function without receiving the operation mode command.

According to the IC card reading/writing apparatus and the IC card system of this invention, it is possible to use the IC card reading/writing apparatus as an apparatus with a desired function by designating the function through an operation mode command once without the necessity of designating the intelligent function or the pass-through function each time through a command from the host. This feature may largely contribute to a reduction in cost required to built the system and a flexibility of the configuration of the system. Particularly, this feature is very effective if it is known beforehand whether the IC card reading/writing apparatus will be used as an apparatus having either the intelligent function or the pass-through function.

BRIEF DESCRIPTION OF THE INVENTION

Figure 7:
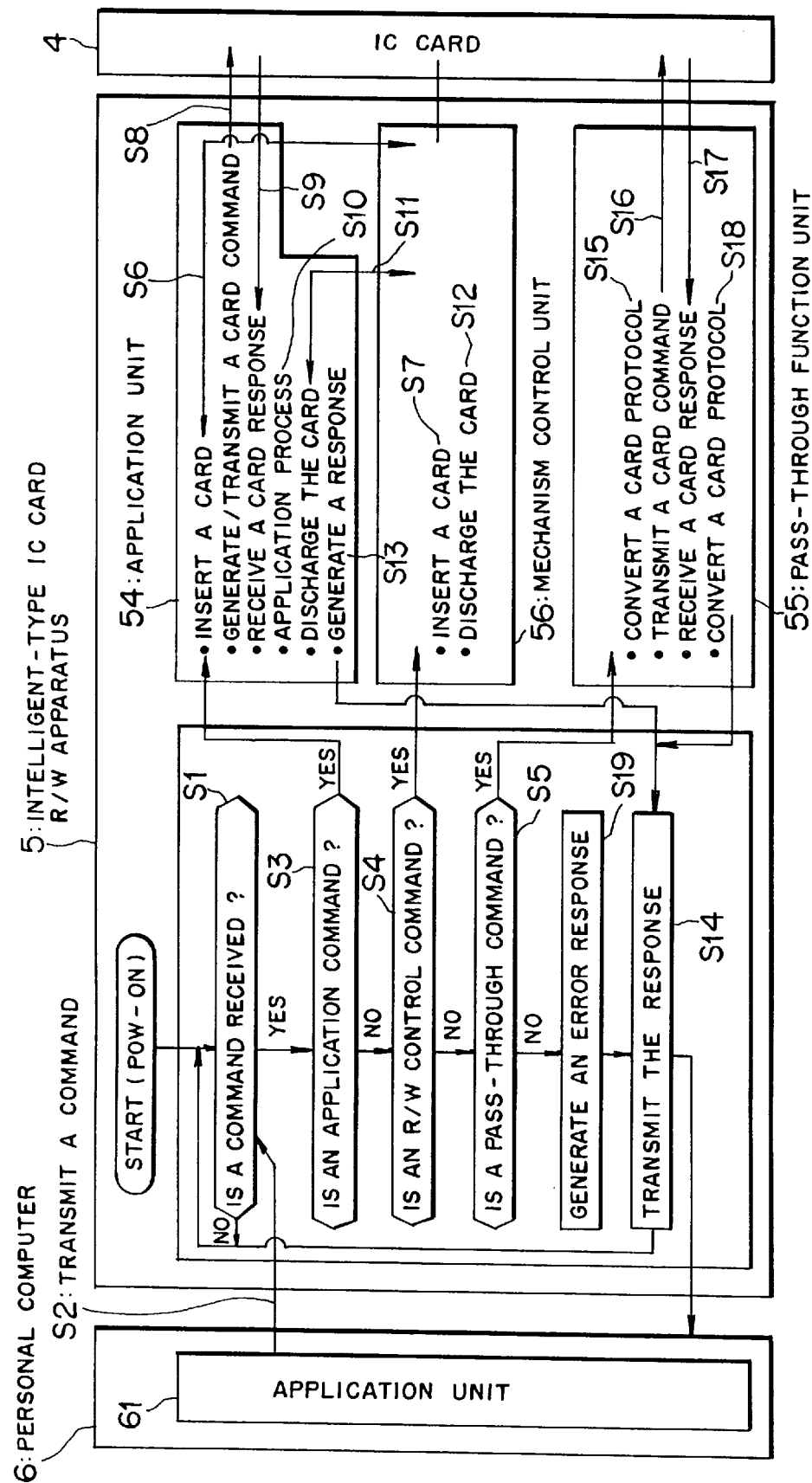
Figure 8:
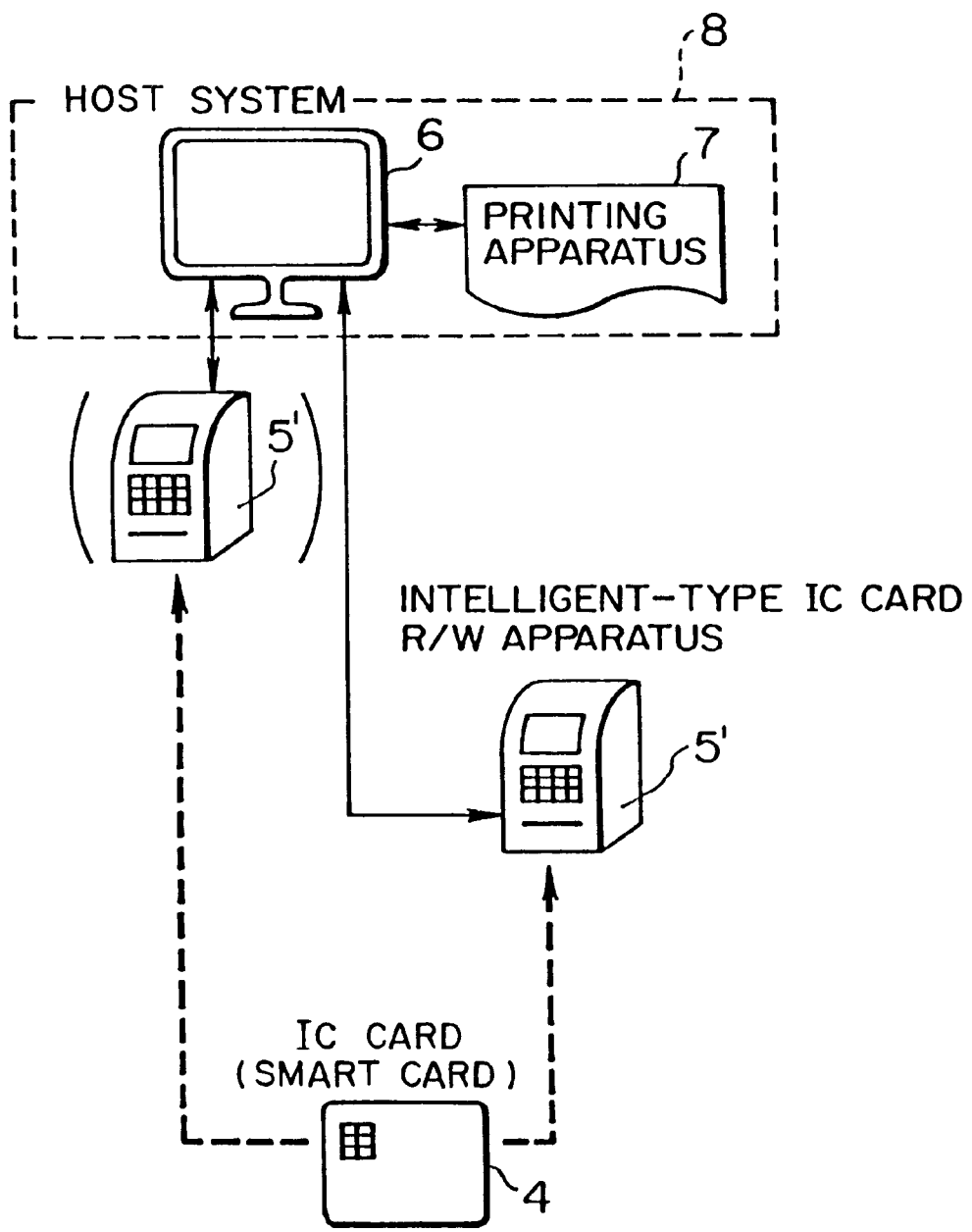
Figure 9:
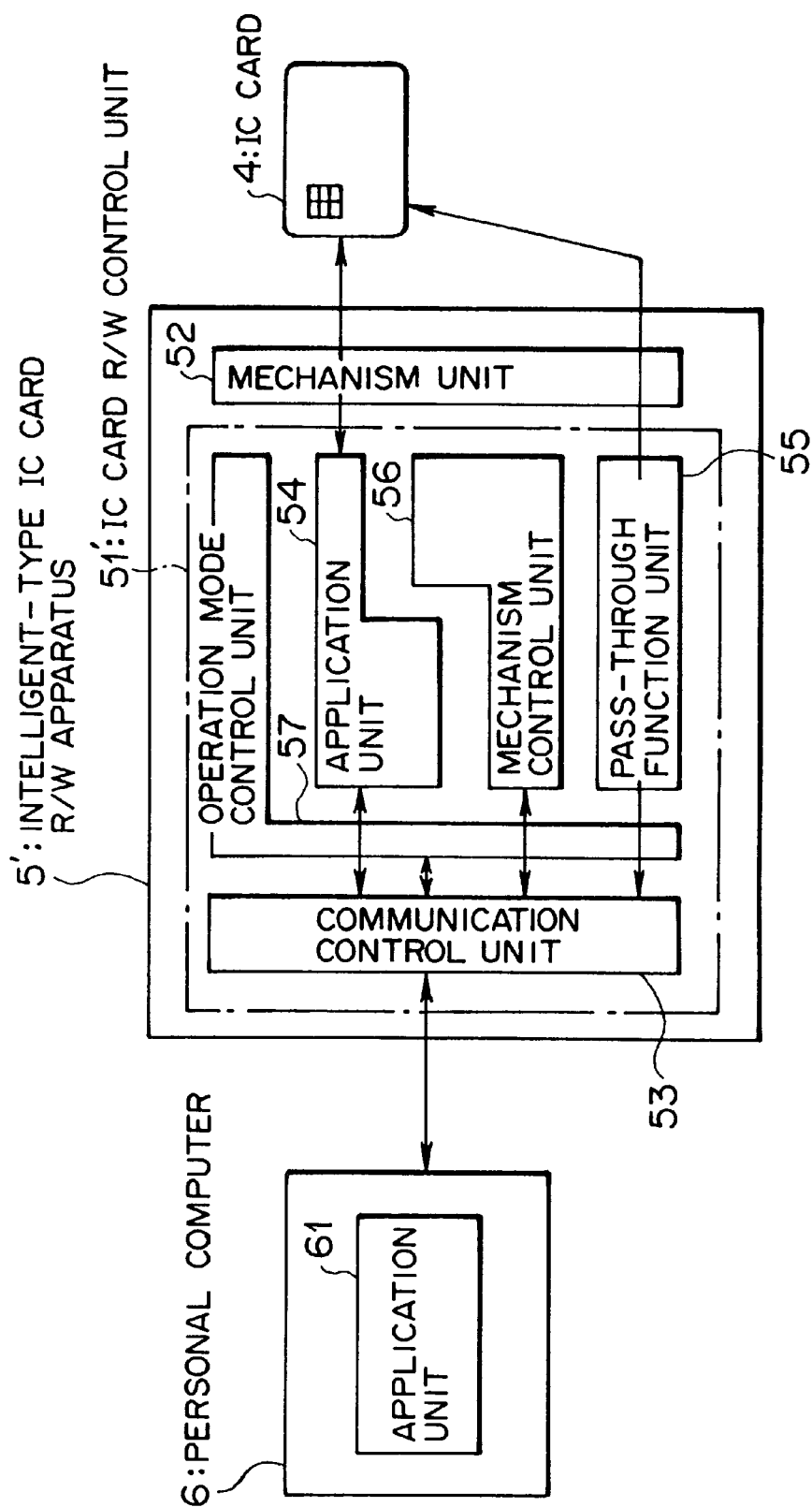
Figure 11:
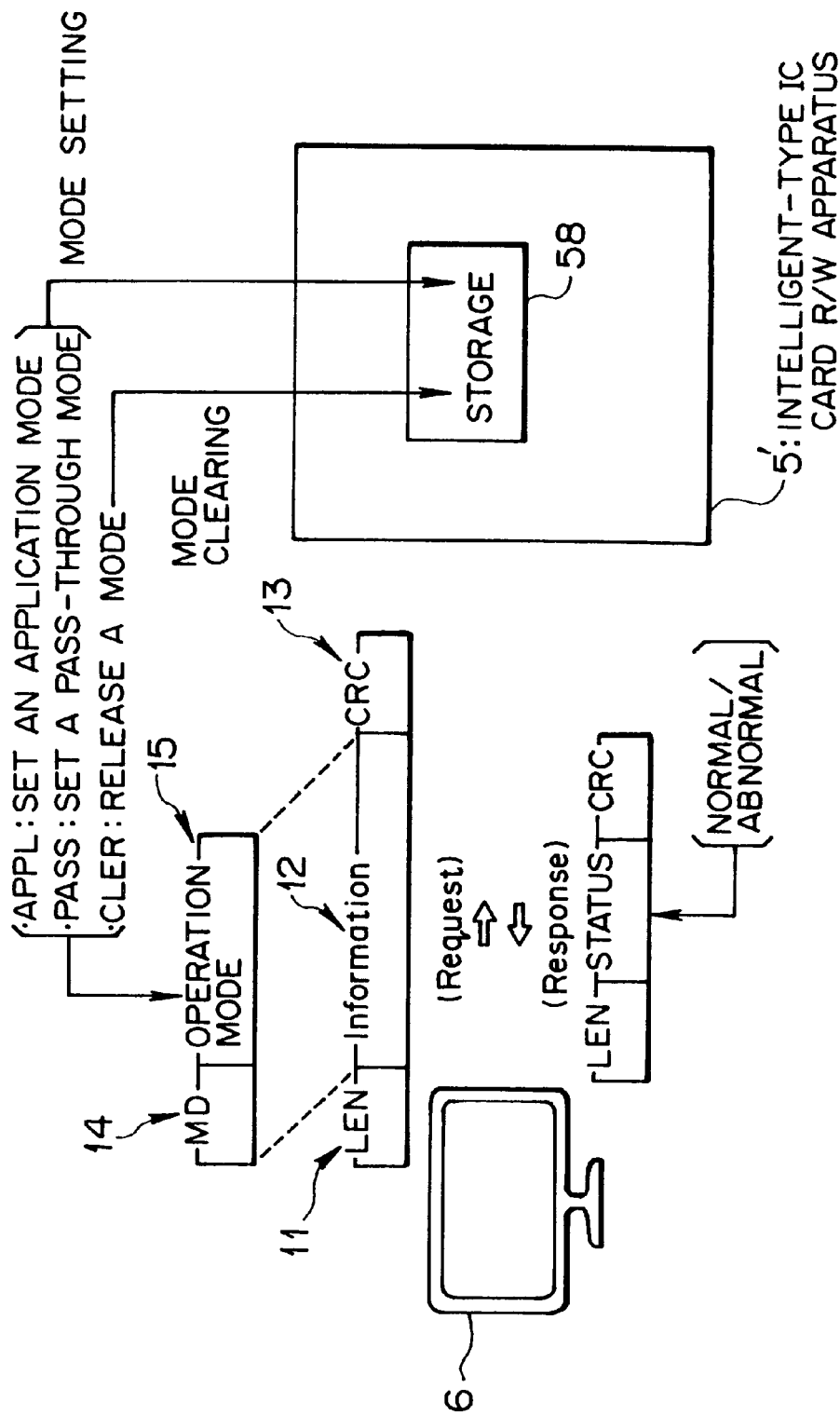
Figure 12:
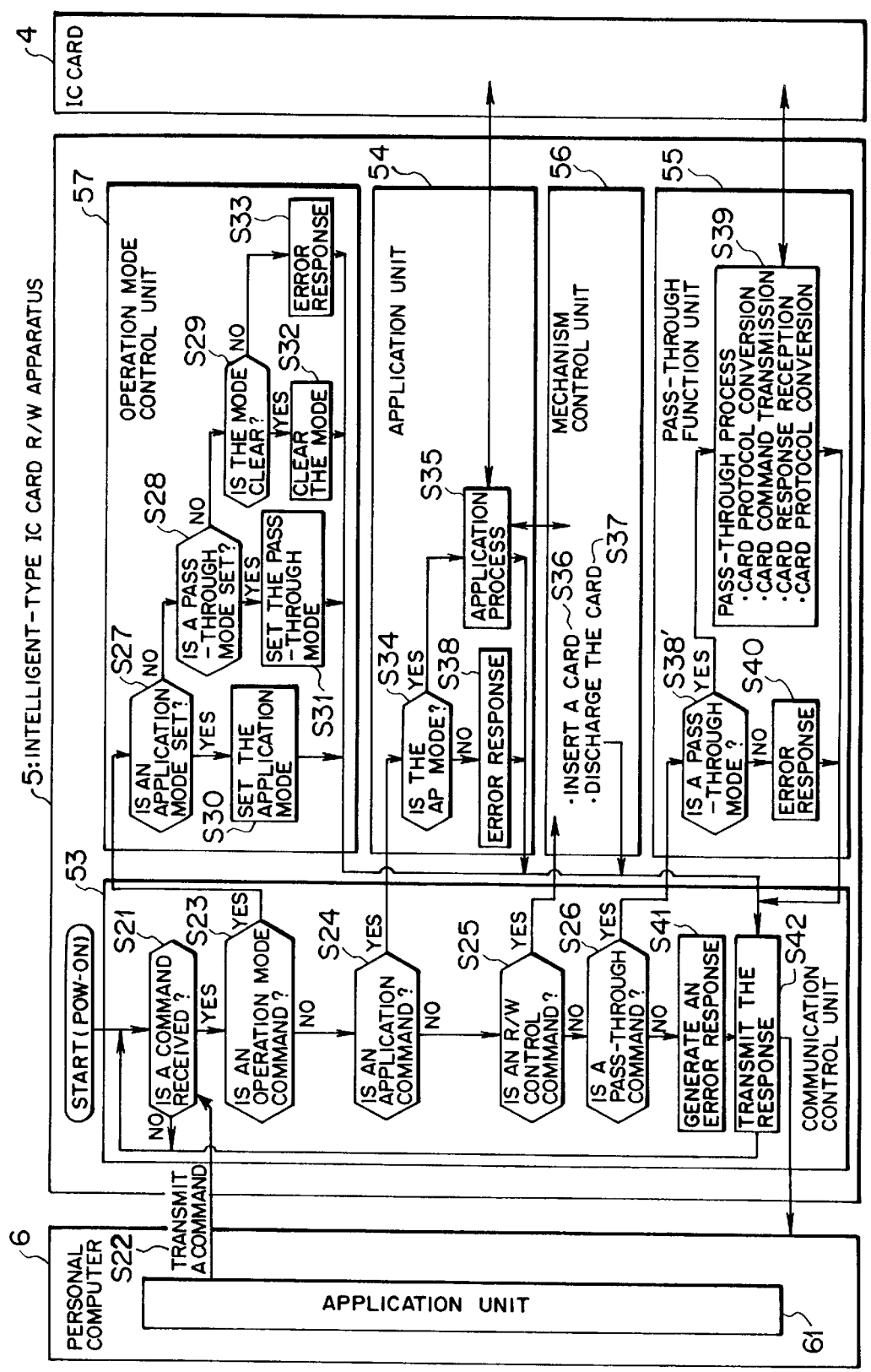
Figure 13:
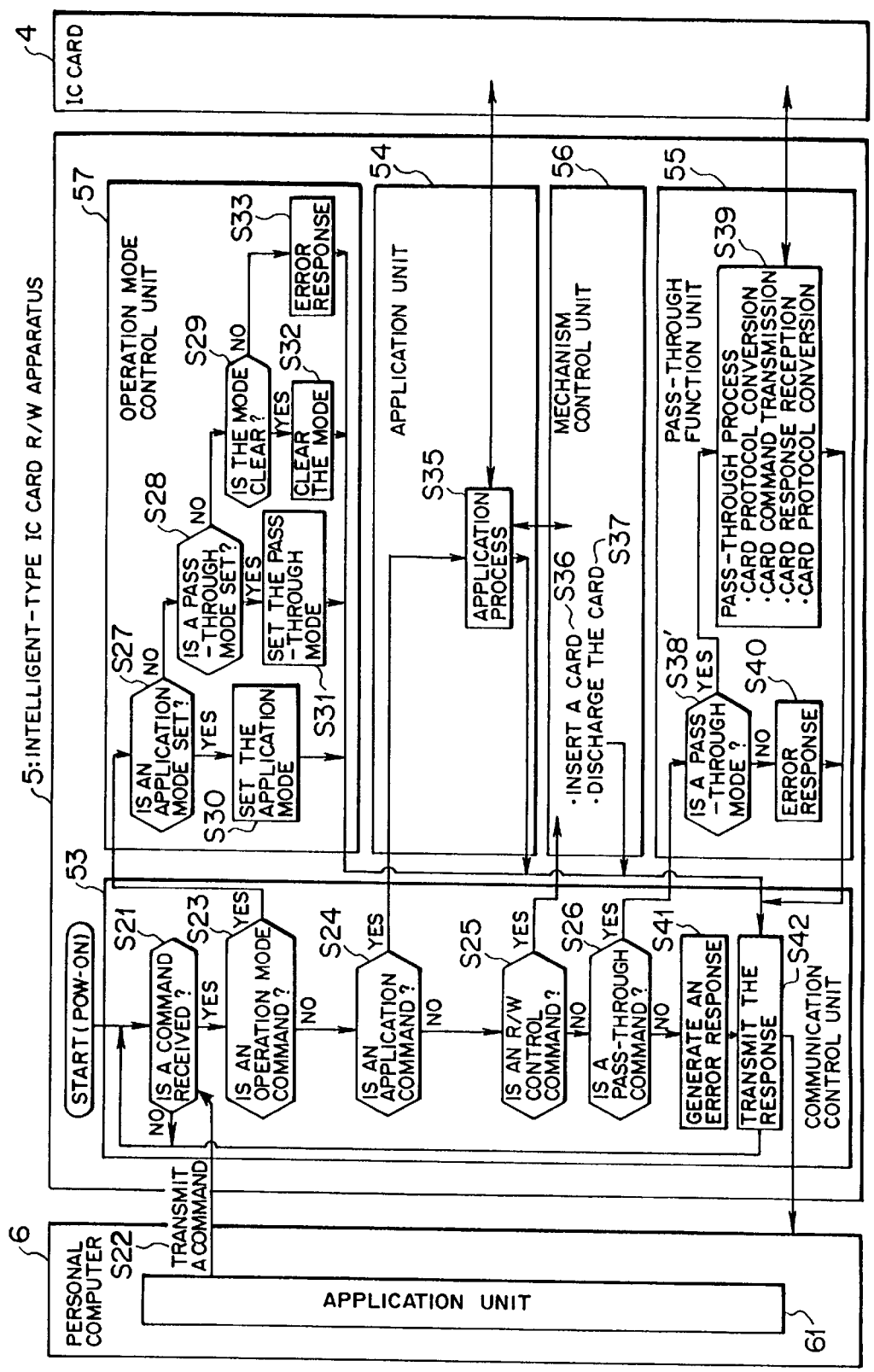
Figure 14:
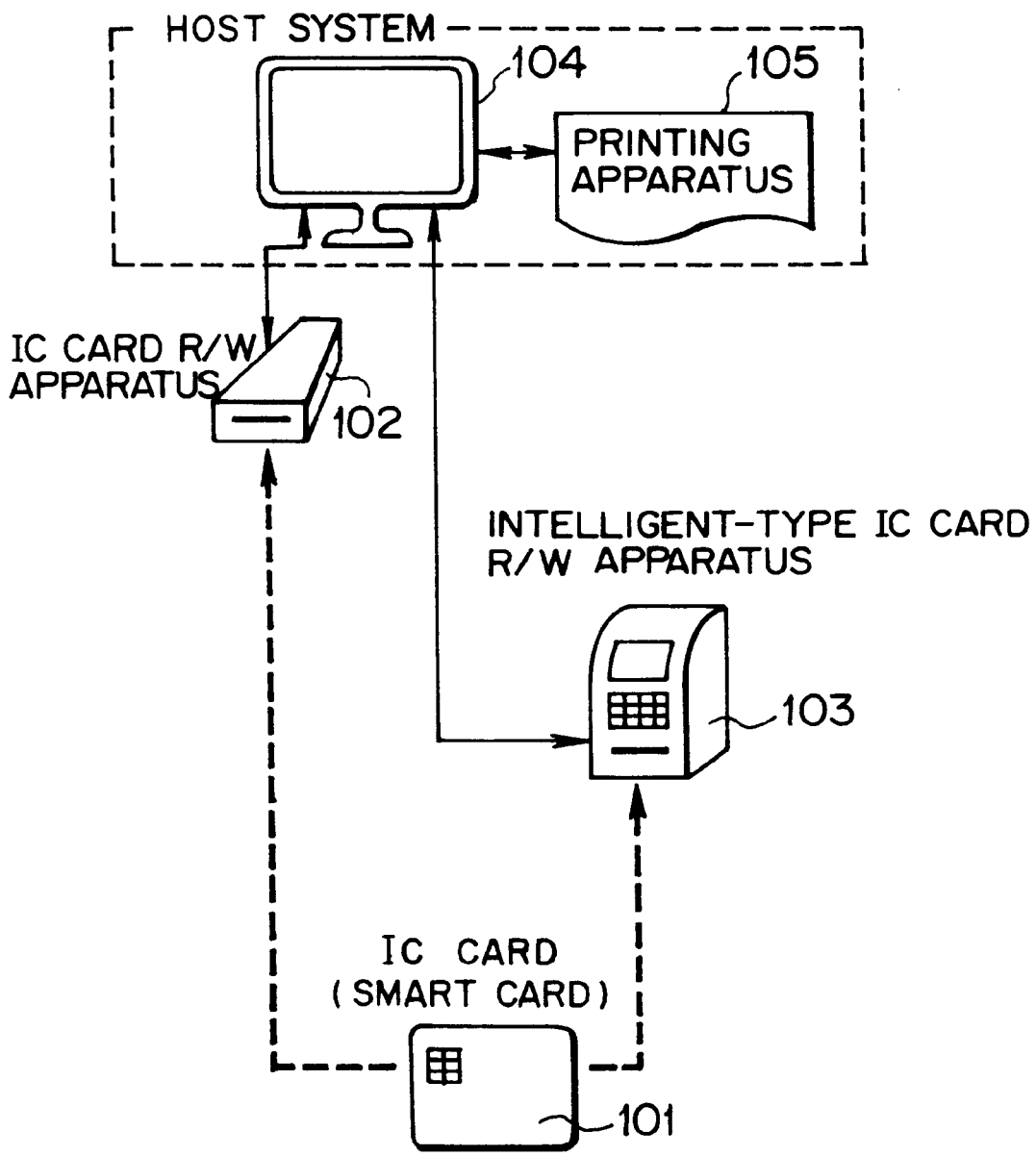
Figure 15:
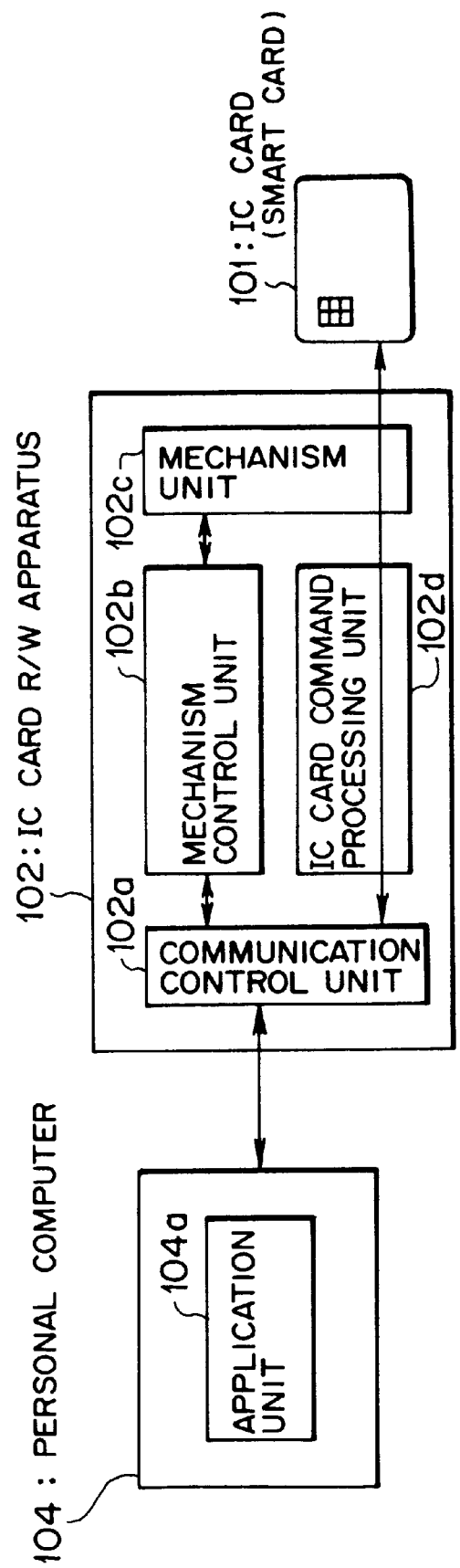
Figure 16:
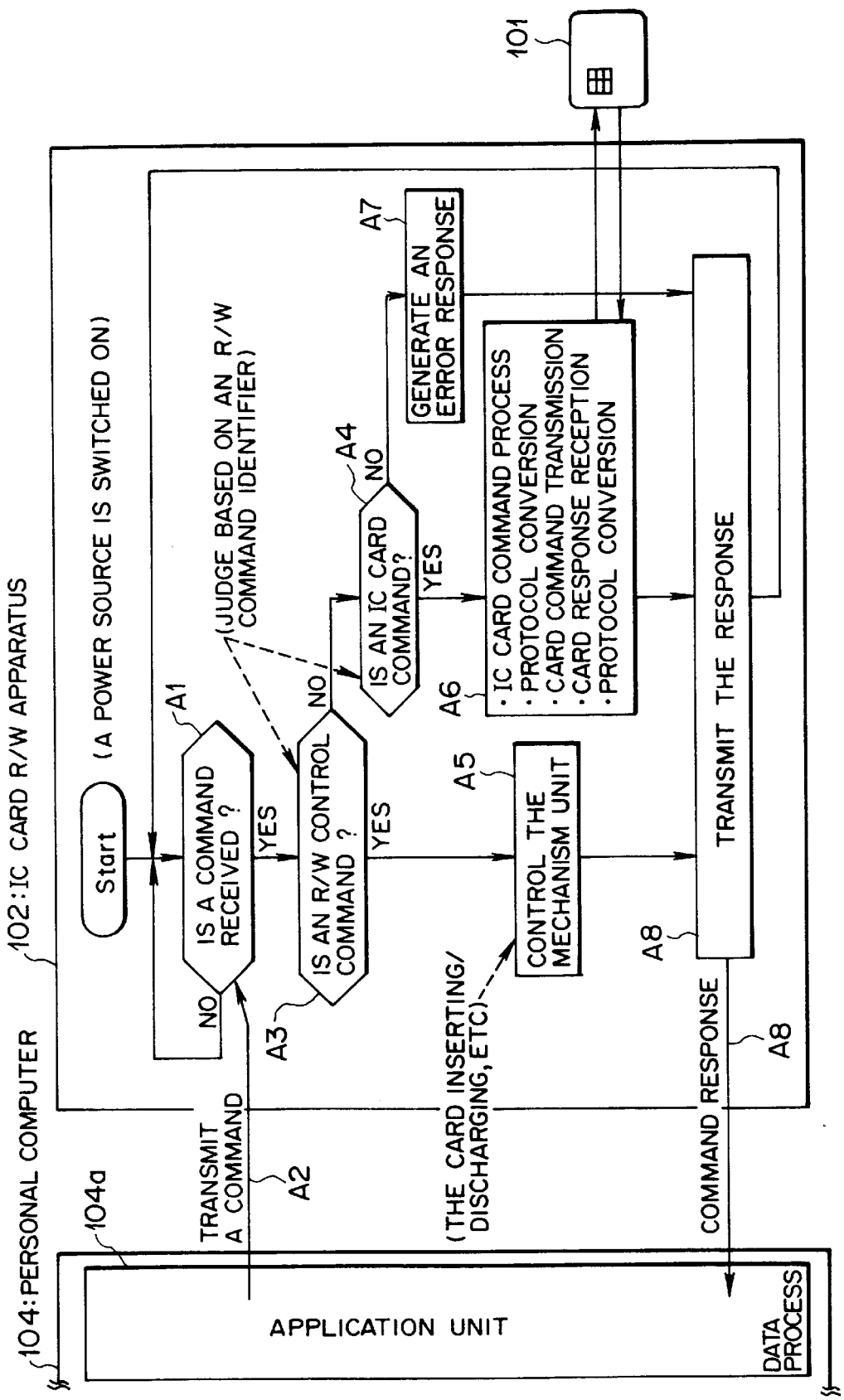
Figure 17:
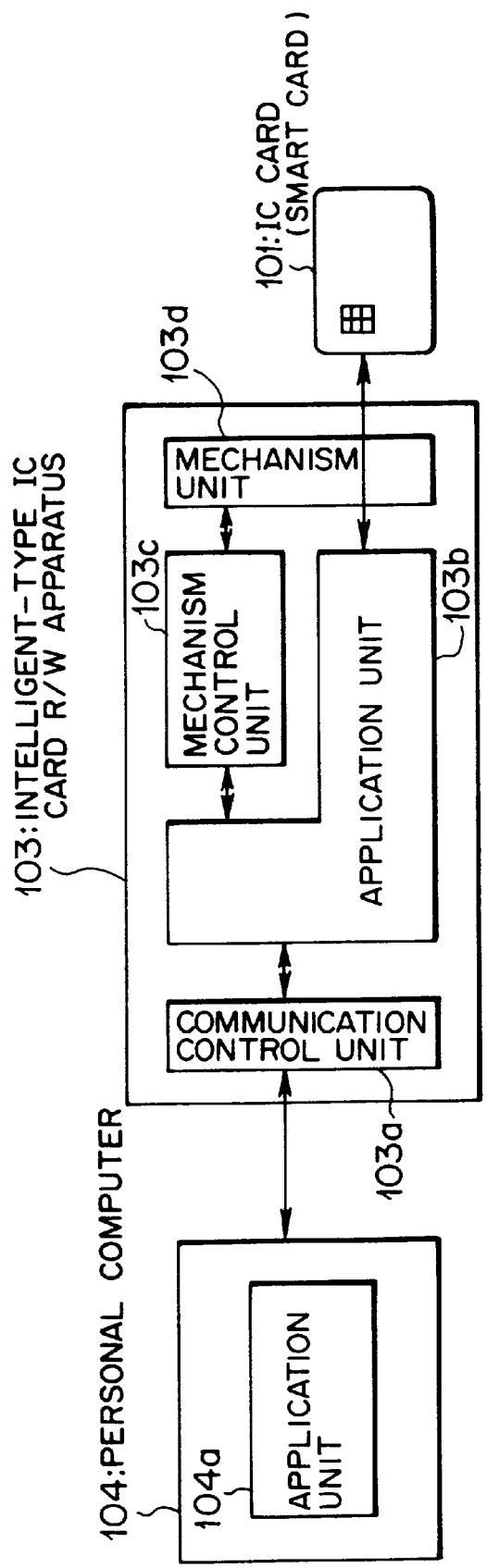
Figure 18:
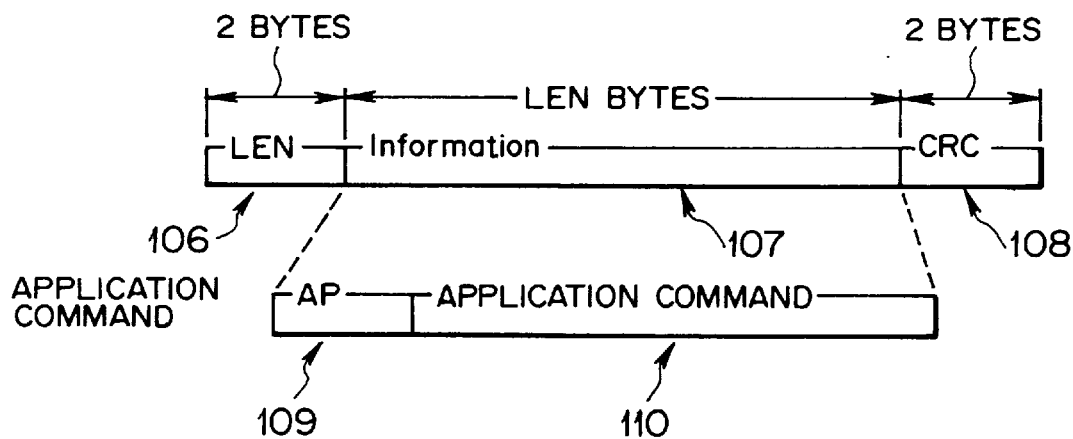
Figure 19:
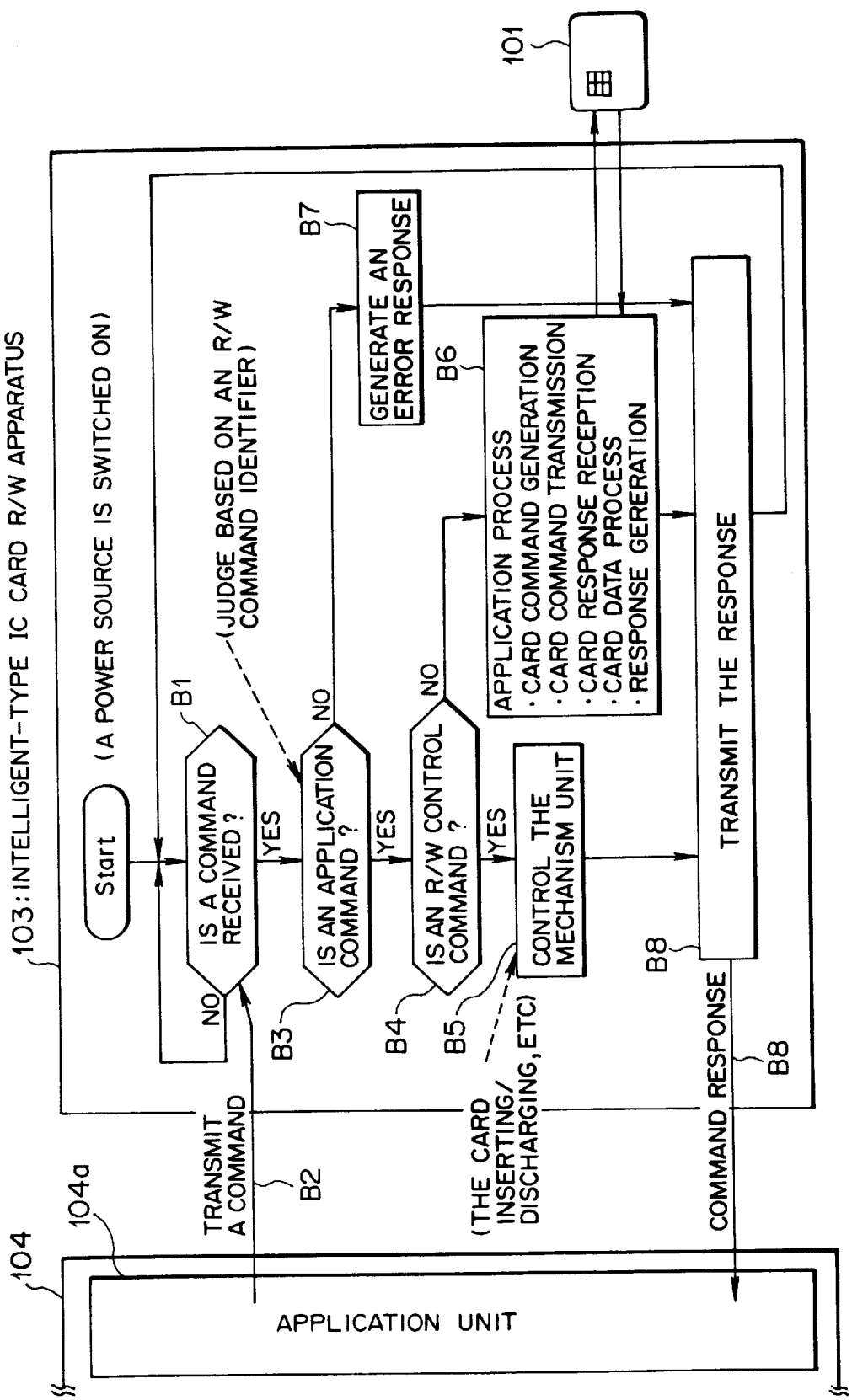
Figure 20:
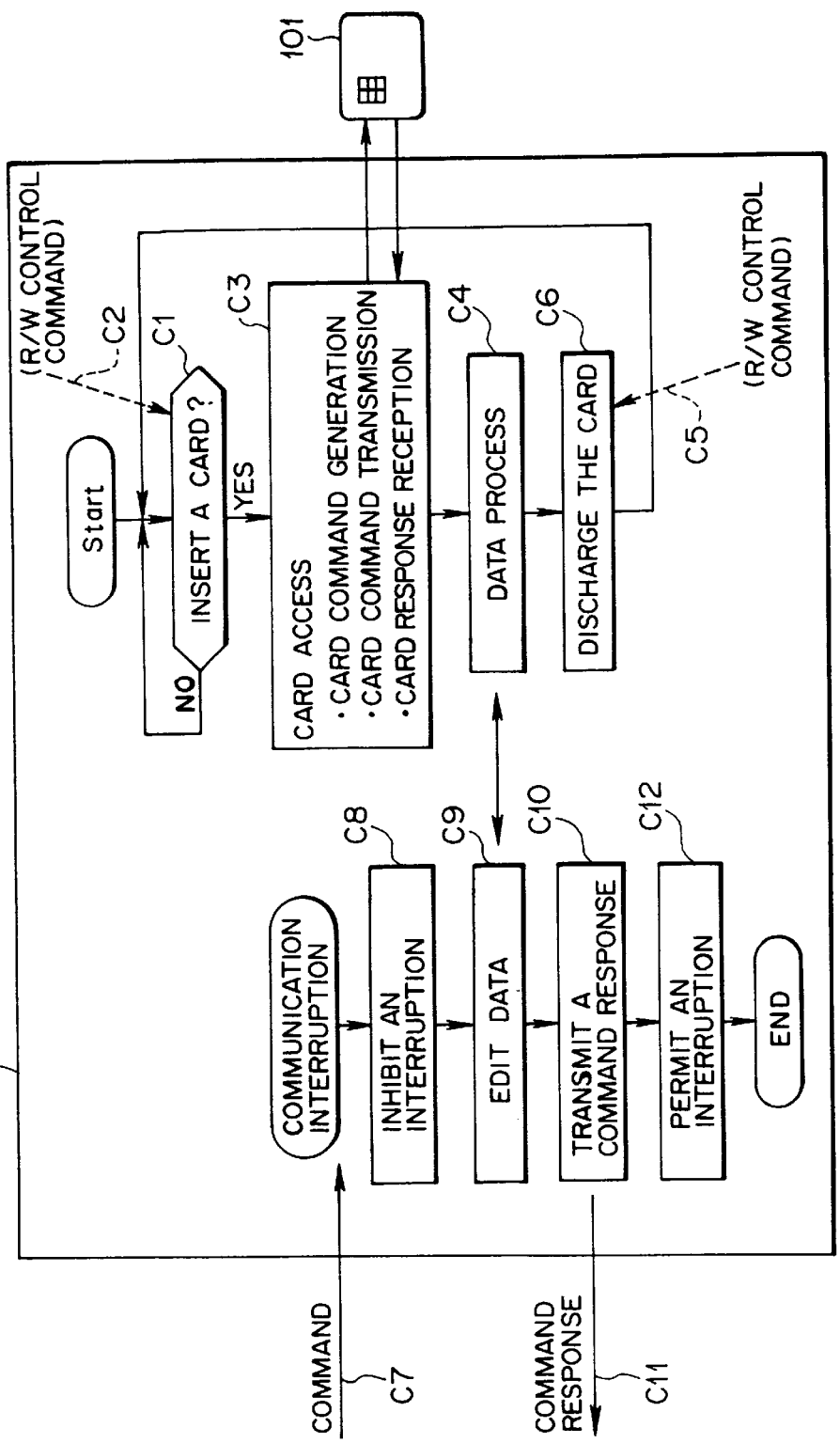

FIGS. 5(a) through 5(d) are diagrams showing an example of an R/W command used in the IC card system according to the embodiment;

FIG. 6 is a diagram for illustrating a concept of a pass-through function of the IC card reading/writing apparatus according to the first embodiment;

FIG. 7 is a flowchart for illustrating an example of an operation of the IC card system according to the first embodiment;

FIG. 8 is a block diagram showing an example of an IC card system according to a second embodiment of this invention;

FIG. 9 is a block diagram showing a structure of an IC card reading/writing apparatus according to the second embodiment of this invention;

FIGS. 10(a) through 10(e) are diagrams showing an example of an R/W command used in the IC card system according to the second embodiment;

FIG. 11 is a diagram for illustrating a concept of an operation by an operation mode command used in the IC card system according to the second embodiment;

FIG. 12 is a flowchart for illustrating an example of an operation of the IC card system according to the second embodiment;

FIG. 13 is a flowchart for illustrating an example of another operation of the IC card system according to the second embodiment;

FIG. 14 is a block diagram showing an example of an IC card system;

FIG. 15 is a block diagram showing a structure of an IC card reading/writing apparatus;

FIG. 16 is a flowchart for illustrating an operation of the IC card reading/writing apparatus;

FIG. 17 is a block diagram showing a structure of an intelligent-type IC card reading/writing apparatus;

FIG. 18 is a diagram showing an example of an R/W command used in the intelligent-type IC card reading/writing apparatus;

FIG. 19 is a flowchart for illustrating an example of an operation of the intelligent-type IC card reading/writing apparatus; and FIG. 20 is a flowchart for illustrating an example of another operation of the intelligent-type IC card reading/writing apparatus.

DESCRIPTION OF THE PREFERRED EMBODIMENTS (a) Description of Aspects of the Present Invention Aspects of the present invention will now be described with reference to the drawings.

Figure 1:
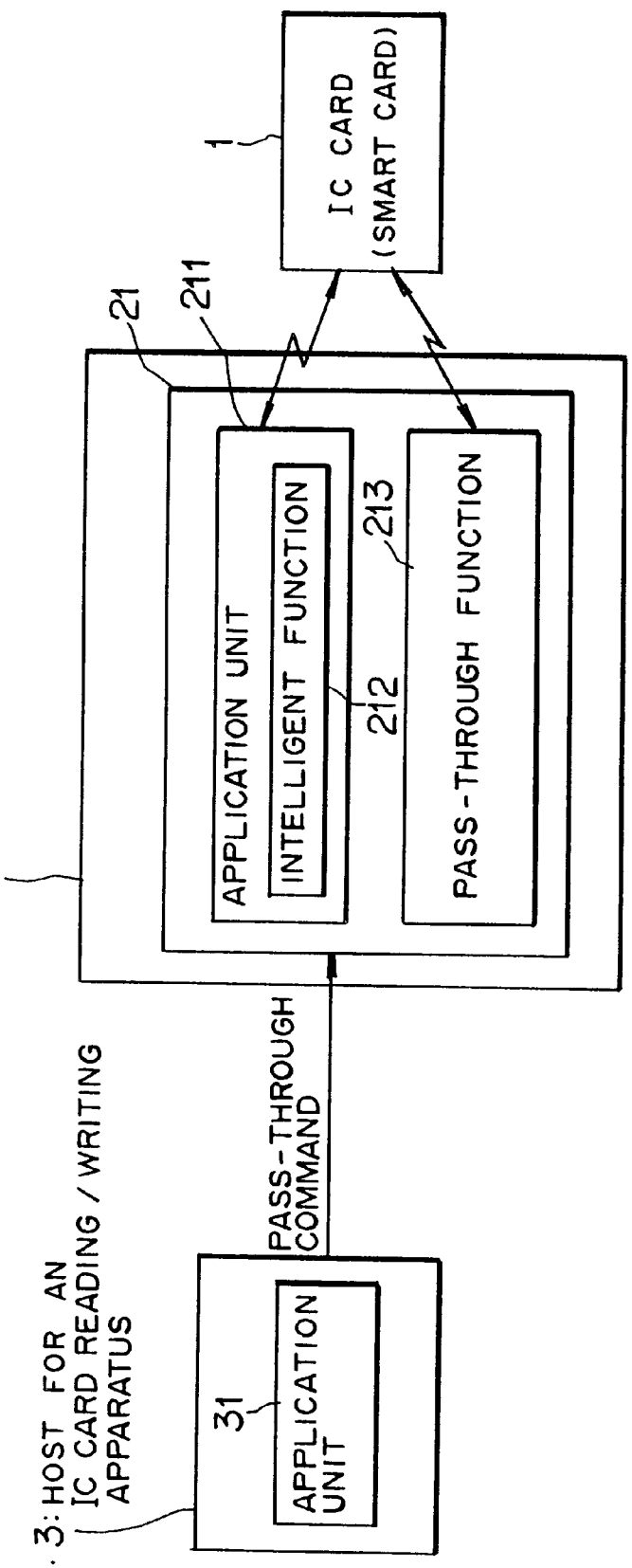
FIG. 1 is a block diagram showing an aspect of this invention.

FIG. 1 is a block diagram showing an aspect of this invention. In FIG. 1, reference numeral 1 denotes an IC card (smart card). Reference numeral 2 denotes an intelligent-type IC card reading/writing apparatus which implements read-out/write-in processing for the IC card 1 by an application unit 211 in itself. Reference numeral 3 denotes a host system for an IC card reading/writing apparatus which can send a pass-through command to the IC card reading/writing apparatus 2.

The IC card reading/writing apparatus 2 has an IC card reading/writing control unit 21, which has an intelligent function 212 to control read-out/write-in processing for the IC card 1 by means of an application unit 211 possessed by itself. Further, the IC card reading/writing control unit 21 has, in addition to the intelligent function 212, a pass-through function 213 to control read-out/write-in processing for the IC card 1, by means of an application unit 31 of the host system 3 for an IC card reading/writing apparatus, by receiving a pass-through command from the host system 3.

According to the IC card reading/writing apparatus 2 and the IC card system mentioned above, the IC card reading/writing apparatus 2 has the pass-through function in addition to the intelligent function, whereby one IC card reading/writing apparatus 2 may be used as both an apparatus with the intelligent function and an apparatus with the pass-through function. This feature may simplify the configuration of the IC card system, largely reduce the cost required to build the system and contribute to flexibility of the configuration of the system.

Figure 2:
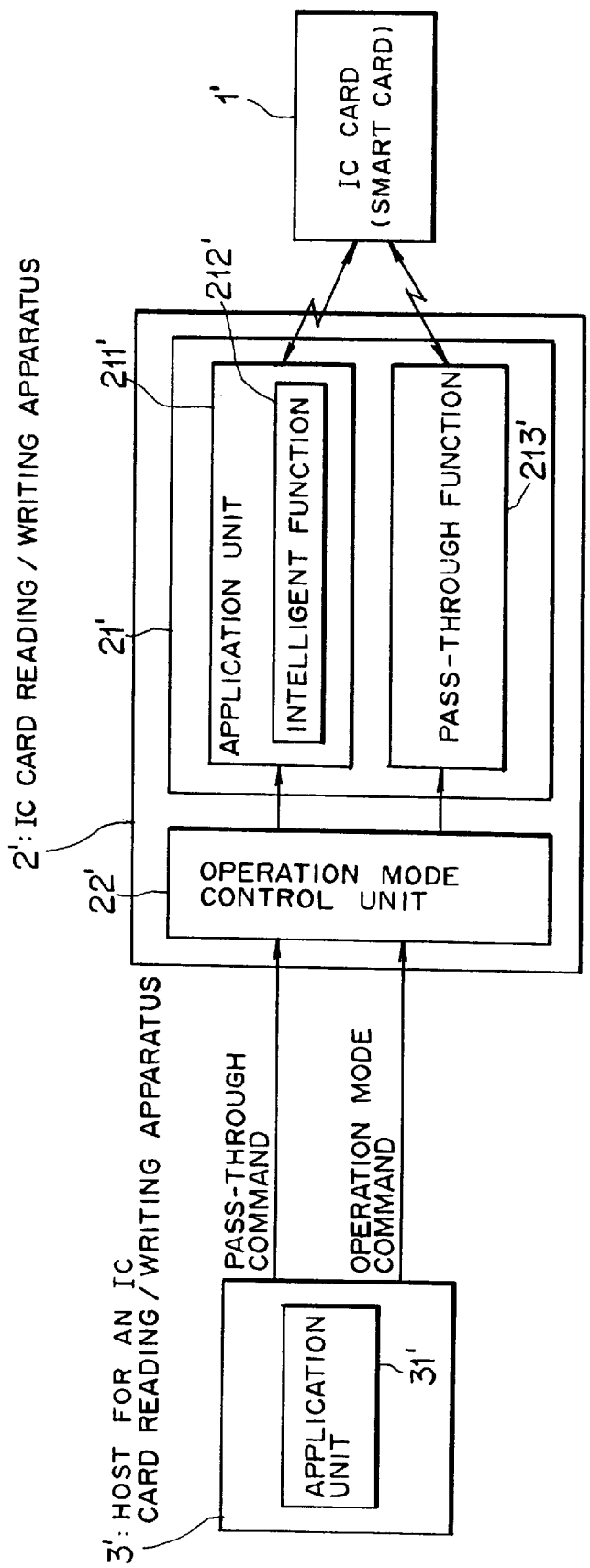
FIG. 2 is a block diagram showing another aspect of this invention.

FIG. 2 is a block diagram showing another aspect of the present invention. In FIG. 2, reference numeral 1' denotes an IC card. Reference numeral 2' denotes an intelligent-type IC card reading/writing apparatus for implementing reading/writing from/to the IC card 1 by an application unit 211' possessed by itself. Reference numeral 3' denotes a host system for an IC card reading/writing apparatus which can send a pass-through command to the IC card reading/writing apparatus 2'. The IC card reading/writing apparatus 2' has an IC card reading/writing control unit 21' and an operation mode control unit 22'.

The IC card reading/writing control unit 21' has an intelligent function 212' to control read-out/write-in processing for the IC card 1' by an application unit possessed by itself. Control unit 21' also has a passthrough function 213' to control read-out/write-in processing for the IC card 1', by an application unit 31' of the host system for an IC card reading/writing apparatus 3', by receiving a pass-through command from the host system 3'. The operation mode control unit 22' receives an operation mode command from the host system 3' and accepts a command corresponding to an operation mode set in response to the operation mode command. The IC card reading/writing apparatus 2' is thereby made to be in a state where either the intelligent function 212' or the pass-through function 213' in the IC card reading/writing control unit 21' is selected.

The IC card reading/writing apparatus 2' and the IC card system mentioned above can make the IC card reading/writing apparatus 2' be in a state where either the intelligent function or the pass-through function is selected according to the operation mode command from the host system 3'. In consequence, it is possible to use the IC card reading/writing apparatus 2' as an apparatus having a desired function by designating the function through an operation mode command once without the necessity of designating the intelligent function or the pass-through function each time through a command from the host system 3'. This feature largely contributes to a reduction in cost required to configure the system and flexibility of the configuration of the system. Particularly, this feature is very effective if it is known beforehand that the IC card reading/writing apparatus 2' is used as an apparatus having either the intelligent function or the pass-through function.

In concrete terms, when receiving the operation mode command from the host system 3', the above-mentioned operation mode control unit 22' holds an operation mode set in response to the operation mode command. When receiving an operation mode release command from the host system 3', the operation mode control unit 22' releases an operation mode held therein.

It is therefore possible at any time to alter a use of the IC card reading/writing apparatus 2' and use it as an apparatus with the intelligent function or the pass-through function even after the IC card system has been built. This is possible because the IC card reading/writing apparatus 2' mentioned above may hold an operation mode set in response to an operation mode command when receiving the operation mode command from the host system 3' and release an operation mode held therein when receiving an operation mode release command from the host system 3'. If another IC card reading/writing apparatus in the system fails, for example, the apparatus 2' may be used as a substitute for the failed apparatus in a quite simple procedure. This feature may largely contribute to reliability of the system.

The operation mode control unit 22' rejects commands except for a command corresponding to an operation mode set in response to an operation mode command while holding an operation mode set in response to the operation mode command.

Since the IC card reading/writing apparatus 2' rejects commands except such a corresponding command (i.e., a command excepting a command corresponding to an operation mode while holding the operation mode set in response to an operation mode command from the host system 3'), there is no case where an operation mode of the IC card reading/writing apparatus 2' is abruptly changed to another operation mode during the operation of the IC card reading/writing apparatus 2'. In consequence, it is possible to certainly and stably continue a process in an operation mode held in the apparatus 2'.

The operation mode control unit 22' may make the IC card reading/writing apparatus 2' be in a state where the intelligent function 212' or the pass-through function 213' has a priority of being operated in the IC card reading/writing control unit 21' and is selected when accepting a command corresponding to a prior operation mode set in advance, even if an operation mode command is not received.

When accepting a command corresponding to a prior operation mode set in advance, the IC card reading/writing apparatus 2' may be in a state where either the intelligent function or the pass-through function which has a priority of being operated is selected, without receiving the operation mode command. This feature is very effective to provide the IC card reading/writing apparatus 2' with a function suitable for a particular purpose, if it is known beforehand whether the IC card reading/writing apparatus 2' is used as an apparatus with either the intelligent function or the pass-through function.

(b) Description of a First Embodiment of the Present Invention

Next, a description will be given of a first embodiment of this invention referring to the drawings.

Figure 3:
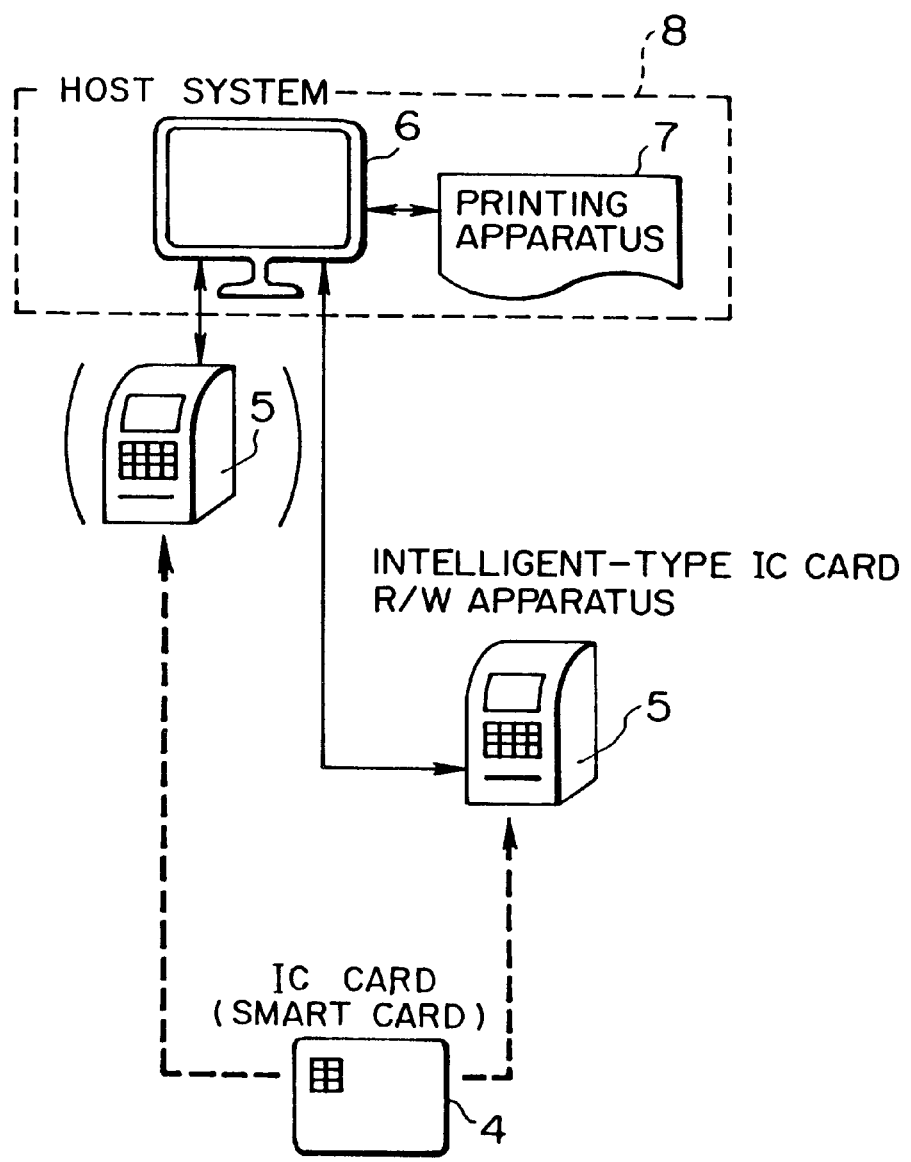
FIG. 3 is a block diagram showing an example of an IC card system according to a first embodiment of this invention.

FIG. 3 is a block diagram showing an example of an IC card system according to a first embodiment of this invention. In FIG. 3, reference numeral 4 denotes an IC card (smart card). Reference numeral 5 denotes an intelligent-type IC card reading/writing (R/W) apparatus with a pass-through function. Reference numeral 6 denotes a personal computer as a host system to which the intelligent-type IC card R/W apparatus 5 is connected. Reference numeral 7 denotes a printing apparatus for printing a result of a process or the like of the personal computer 6. According to this embodiment, the personal computer 6, the printing apparatus 7 and the like, for example, configure a host system 8.

Figure 4:
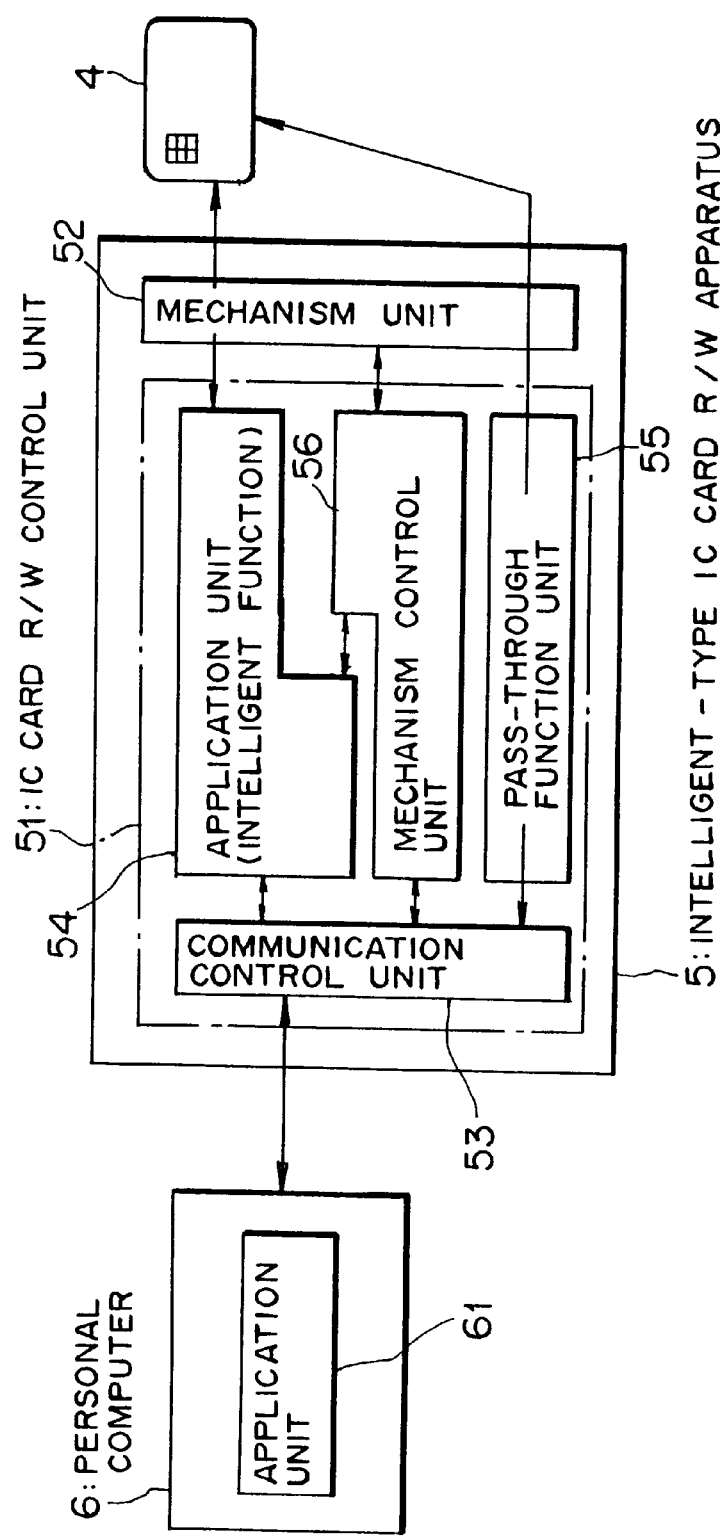
FIG. 4 is a block diagram showing a structure of an IC card reading/writing apparatus according to the first embodiment.

The above-mentioned IC card R/W apparatus 5 has an IC card R/W control unit 51 for controlling readout/write-in processing for the IC card 4. Apparatus 5 also has a mechanism unit 52 including a motor or the like for fetching (inserting)/discharging the IC card 4 as shown in FIG. 4, for example. Further, the IC card R/W control unit 51 has a communication control unit 53, an application unit 54, a pass-through function unit 55 and a mechanism control unit 56.

In the IC card R/W control unit 51, the communication control unit 53 identifies a type of a R/W command to instruct a reading/writing process on the IC card 4 from the personal computer 6. Control unit 51 controls a process in the IC card R/W control unit 51 according to a result of the identification. In one type of case, the R/W command from the personal computer 6 is an application command to instruct to perform a reading/writing process on the IC card 4 by means of the application unit 54 built in the IC card R/W control unit 51. In such a case, the application unit 54 communicates with the inserted IC card 4 to perform a card data process on card data of the IC card 4.

If the R/W command from the personal computer 6 is a pass-through command, the pass-through function unit 55 converts the communication protocol of the pass-through command adaptive to the IC card 4 and transmits it to the IC card 4, as described later. The pass-through function unit 55 further conversely converts a response to the R/W command into a communication protocol adaptive to the personal computer 6 and transmits it to the personal computer 6. In this manner, the application unit 61 of the personal computer 6 performs a data process on the card data of the IC card 4.

The mechanism control unit 56 receives a R/W control command to instruct to fetch/discharge the IC card 4 from the application unit 54 or the personal computer 6, so as to fetch/discharge the IC card 4 by driving a motor or the like of the mechanism unit 52.

Figure 5A:
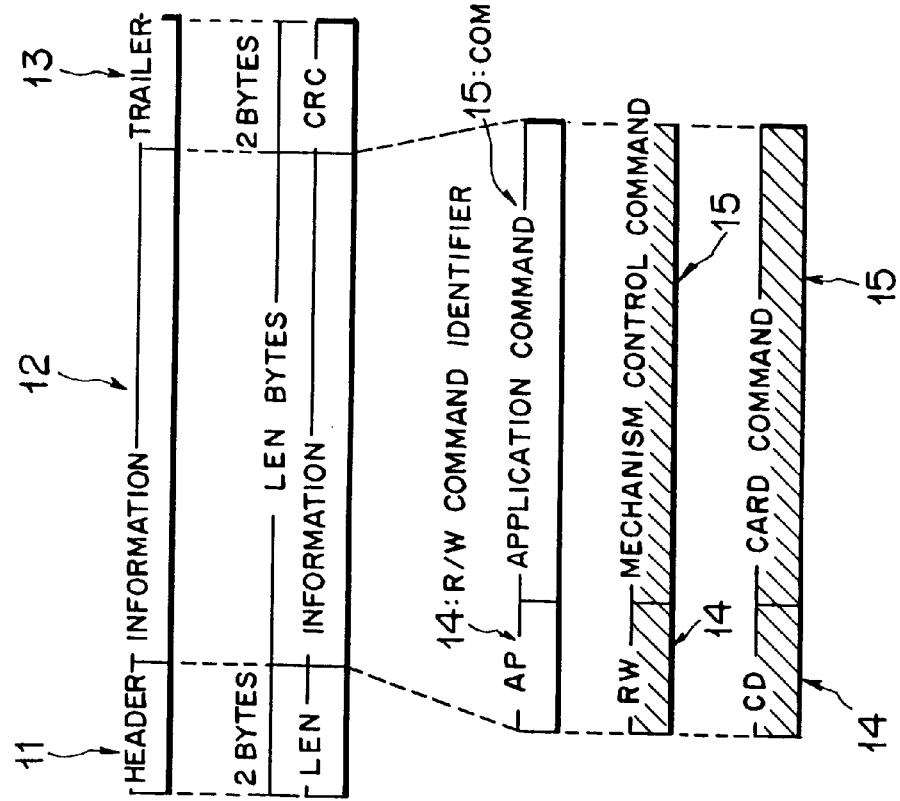

Incidentally, the R/W command used in the above-mentioned intelligent-type IC card R/W apparatus 5 has, in general, a header part 11, an information part 12 and a trailer part (CRC) 13. The header part 11 is used to store a length "LEN" (bytes) of the information part 12. The information part 12 is used to store various commands for the IC card R/W apparatus 5. The trailer part (CRC) 13 is used to check a command as shown in FIG. 5(a), for example. Further, the information part 12 is used to store an application command to control the application unit 54 having an R/W command identifier ("AP", for example) 14. The application command also has a command part 15 which is designated a command code, a parameter and the like as shown in FIG. 5(b), for example.

The intelligent-type IC card R/W apparatus 5 can thereby identify whether a R/W command is an application command or not based on the R/W command identifier 14 stored in the information unit 12 when receiving an R/W command having the above-mentioned format from the personal computer 6.

Suppose, for example, that an existing intelligent-type IC card R/W apparatus receives an application command having an identifier ("AP") in the R/W command identifier 14 that designates a command to accumulate any data in the command code of the command part 15. The application unit 54 of the existing R/W apparatus then gives an instruction to fetch the IC card 4 into the mechanism control unit 56. The mechanism control unit 56 given the instruction controls the mechanism unit 52 so as to fetch the IC card 4. The IC card R/W apparatus then reads out data in the IC card 4 to accumulate the data, then notifies a result of the accumulation to the personal computer 6.

This application command is, however, a command prepared to make the application unit 54, built into the intelligent-type IC card R/W apparatus 5, to execute control on the reading/writing process (the intelligent function) on the IC card 4. Therefore, this application command cannot make the pass-through function unit 55 execute control on the reading/writing process (the pass-through function) on the IC card 4.

According to this embodiment, there are newly prepared a R/W control command as shown in FIG. 5(c) and a pass-through command as shown in FIG. 5(d), for example.

This makes it possible to execute the pass-through function, in addition to the existing application command [refer to FIG. 5(b)]. In the R/W control command, an identifier ("R/W", for example) 14, representing "R/W control", and a command part 15, designating the R/W control (card inserting/discharging), are stored as shown in FIG. 5(c). In the pass-through command, an identifier ("CD", for example) 14, representing "pass-through", and a command part 15, designating a command and a parameter for the IC card 4, are stored as shown in FIG. 5(c).

Suppose that the R/W control command or the pass-through command is stored in the information unit 12 of the R/W command similarly to the existing application command [refer to FIG. 5(a)] and transmitted to the intelligent-type IC card R/W apparatus 5. Only in such a case, even the intelligent-type IC card R/W apparatus 5 can directly perform a reading/writing process on card data of the IC card 4 from the application unit 61 of the personal computer 6 in the host system 8, rather than from the application unit 54 built therein.

Namely, the above-mentioned IC card R/W apparatus 5 has the IC card R/W control unit 51 having the intelligent function to implement a control on read-out/write-in processing for the IC card 4 by the application unit 54 possessed by itself. Further, the IC card R/W control unit 51 has, in addition to the intelligent function, the pass-through function unit 55 for controlling read-out/write-in processing for the IC card 4 by the application unit 61 of the host system 6 by receiving the pass-through command from the personal computer 6.

Concretely, the pass-through function unit 55 deletes the header part (LEN) 11, the trailer part 13 and the command identifier 14 of the received R/W command (in a nest state where the pass-through command having a card command in the command part 15 is stored in the information part 12). The received R/W command is received from the personal computer 6 as shown in FIG. 6, for example. After that, the pass-through function unit 55 gives a checking byte (EDC) to the card command to convert the communication protocol of the received R/W command adaptive to the IC card 4 and transmits the R/W command to the IC card 4. On the other hand, the pass-through function unit 55 performs an inverse process of the above on a response from the IC card 4 to convert the communication protocol of the response into the original communication protocol (adaptive to the personal computer 6), and transmits the response to the personal computer 6.

Operation of the IC card system having the above structure can be described as following in detail with reference to the flowchart (Steps S1 through S19) shown in FIG. 7.

The intelligent-type IC card R/W apparatus 5 first comes to a command reception waiting state when activated (NO route at Step S1). If the personal computer 6 transmits a RAN command (Step S2) and the intelligent-type IC card R/W apparatus 5 receives the R/W command in this state (if a decision at Step S1 is YES), the communication unit 53 in the IC card R/W apparatus 5 determines whether the received R/W command is an application command, a R/W control command or a pass-through command (Steps S3 through S5).

If the received R/W command is, for example, an application command (a decision at Step S3 is YES), the application unit 54 transmits an instruction to insert (fetch) the IC card 4 to the mechanism control unit 56 (Step S6). The control unit 56 thereby controls the mechanism unit 52 to fetch the IC card 4 (Step S7).

Subsequently, the application unit 54 generates a card command for the IC card 4 and transmits it to the IC card 4 (Step S8). When receiving a response to the card command (Step S9), the application unit 54 performs an application process, such as a reading process, an editing process and the like, on card data in the IC card 4 (Step S10).

When the application process is terminated, the application unit 54 gives an instruction to discharge the IC card 4 to the mechanism control unit 56 (Step S11). The mechanism control unit 56 thereby controls the mechanism unit 52 to discharge the IC card 4 (Step S12). Then, the application unit 54 generates a response to the personal computer 6 (Step S13) and transmits it to the personal computer 6 through the communication control unit 53 (Step S14).

If the R/W command received from the personal computer 6 is a R/W control command (a decision at Step S3 is NO and at Step S4 is YES), in the intelligent-type IC card R/W apparatus 5, the mechanism control unit 56 controls the mechanism unit 52 to perform only an inserting/discharging process on the IC card 4 (Steps S7 and S12). Then a response to the received R/W control command is transmitted to the personal computer 6 through the communication control unit 53 (Step S14).

The R/W command received from the personal computer 6 may be a pass-through command (if decisions at Steps S3 and S4 are NO and at Step S5 is YES), in the intelligent-type IC card R/W apparatus 5. In this case, the pass-through function unit 55 converts the communication protocol of the received R/W command (the card command) adaptive to the IC card 4 as described before with reference to FIG. 6. Unit 55 transmits the R/W command to the IC card 4 (Steps S15 and S16). The pass-through function unit 55 then converts the communication protocol of the response to the card command adaptive to the personal computer 6 (Steps S17 and S18) and then transmits the response to the personal computer 6 (Step S14).

If the R/W command received from the personal computer 6 is neither an application command nor a R/W control command nor a pass-through command (if decisions at Steps S3 through S5 are all NO), the communication control unit 53 generates an error response (Step S19). Control unit 53 transmits this error response to the personal computer 6 (Step S14).

According to the IC card system of this embodiment, the IC card R/W apparatus 5 has the IC card R/W control unit 51 having the intelligent function to control read-out/write-in processing for the IC card 4 by the application unit 54 in itself. Further, the IC card R/W control unit 51 has, in addition to the intelligent function, a pass-through function. This pass-through function is to read from and write to the IC card 4 by means of the application unit 61 of the personal computer 6 by receiving the pass-through command from the personal computer 6, as above. It is therefore possible to use one intelligent-type IC card R/W apparatus 5 as either a R/W apparatus with the intelligent function or a R/W apparatus with the pass-through function.

In consequence, it is possible to simplify the structure of the IC card system with only the above-mentioned intelligent-type IC card R/W apparatus 5. It is also possible thereby to largely reduce the cost required to configure the system and largely contribute to flexibility of the configuration of the system.

(c) Description of a Second Embodiment of the Present Invention

FIG. 8 is a block diagram showing an example of an IC card system according to a second embodiment of this invention. In FIG. 8, reference numeral 4 denotes an IC card. Reference numeral 5' denotes an intelligent-type IC card reading/writing (RNV) apparatus. Reference numeral 6 denotes a personal computer as a host system to which the IC card R/W apparatus 5' is connected. Reference numeral 7 denotes a printing apparatus for printing a result of a process or the like of the personal computer 6. According to this embodiment as well, the personal computer 6, the printing apparatus 7 and the like configure, for example, the host system 8.

The above-mentioned IC card R/W apparatus 5' has an IC card R/W control unit 51' for controlling readout/write-in processing for the IC card 4. Apparatus 5' also has a mechanism unit 52 having a motor and the like used to fetch/discharge the IC card 4 as shown in FIG. 9, for example. According to this embodiment, the IC card R/W control unit 51 has a communication control unit 53, an application unit 54, a pass-through function unit 55, and a mechanism control unit 56 which are similar to those according to the first embodiment. The IC card R/W control unit 51' also has an operation mode control unit 57.

The operation mode control unit 57 sets either an application mode or a pass-through mode. The application mode (an intelligent mode) controls reading/writing process on the IC card 4 by the application unit 54. The pass-through mode controls reading/writing process on the IC card 4 by the pass-through function unit 55 according to an operation mode command from the personal computer 6 described later.

Namely, the above-mentioned IC card R/W apparatus 5' has the IC card R/W control unit 51' having both an intelligent function and a pass-through function. The intelligent function controls read-out/write-in processing for the IC card 4 by means of the application unit 54 in itself. The pass-through function unit 55 controls read-out/write-in processing for the IC card 4 by means of the application unit of the personal computer 6 by receiving a pass-through command from the personal computer 6. The IC card R/W apparatus 5' thereby receives an operation mode command from the personal computer 6 and accepts a command corresponding to an operation mode. The operation mode is set in response to the operation mode command so that the operation mode control unit 57 can select either the intelligent function or the pass-through function in the IC card R/W control unit 51'.

Figure 10:
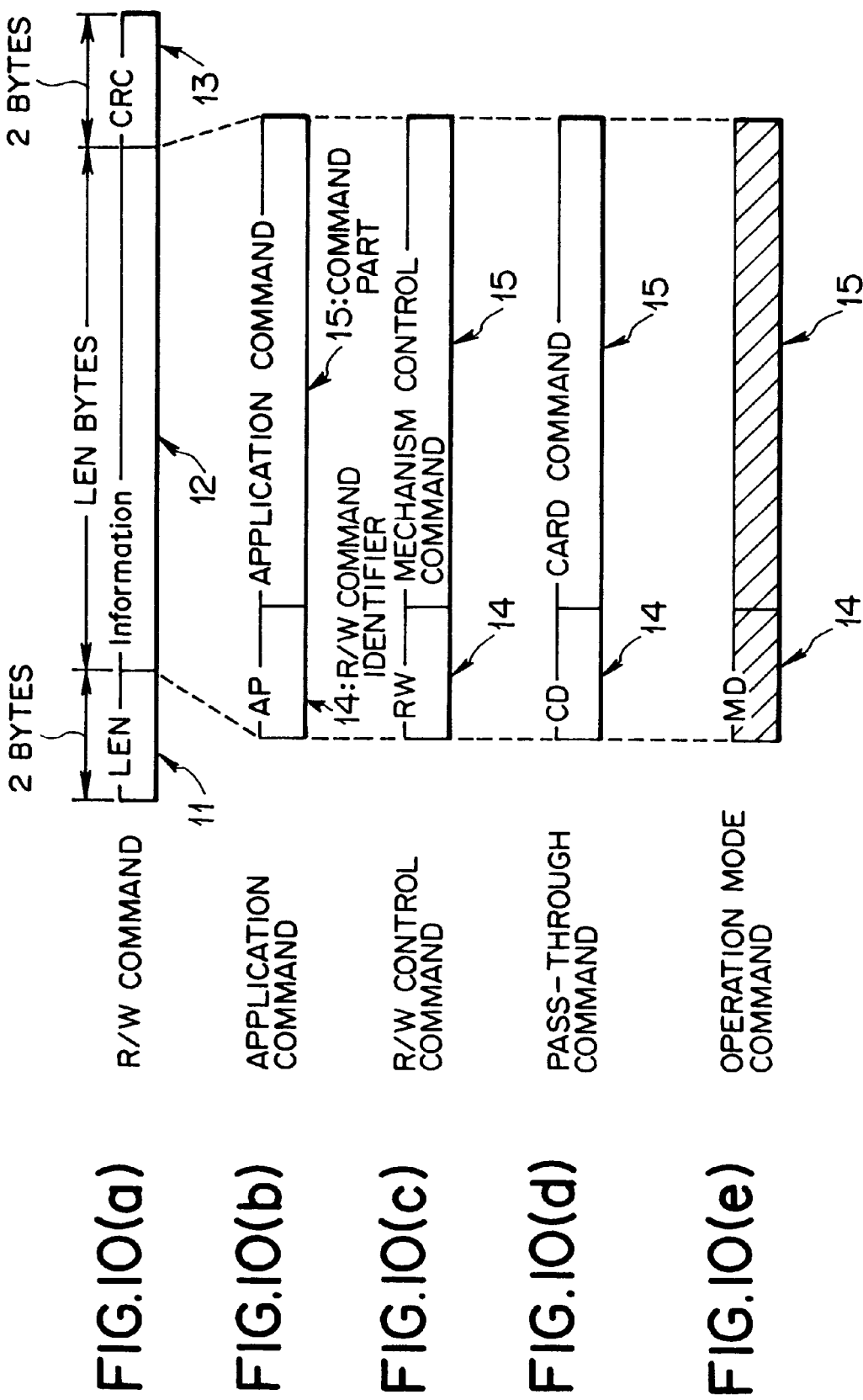

Incidentally, the operation mode command has, similarly to the first embodiment, a R/W command identifier ("MD", for example) 14 and a command part 15 designated instruction to release the application mode or the pass-through mode as shown, for example, in FIG. 10(e). The operation mode command is stored in an information part 12 of a R/W command transmitted from the personal computer 6. The R/W command has a format as shown in FIG. 10(a) similarly to the application command, the R/W control command and the pass-through command shown in FIGS. 10(b) through 10(d), respectively.

If an operation mode of the IC card R/W 5' is set according to the operation mode command as shown in FIG. 11, for example, the operation mode set is held in a storage 58 within the IC card R/W apparatus 5'. The set operation mode is cleared when a power supply of the IC card R/W apparatus 5' is switched off. If the set operation mode is released, the operation mode held in the storage 58 is cleared. If the operation mode is not set, any command other than a R/W control command is rejected.

Next an operation of the IC card system having the above structure will be described with reference to the flowchart (Steps S21 through S42) shown in FIG. 12.

When activated (when a power supply is switched on), the IC card R/W apparatus 5' comes to a command reception waiting state (NO route at Step S21). The personal computer 6 transmits a R/W command (Step S22) and the IC card R/W apparatus 5' receives this R/W command in this state (if a decision at Step 21 is YES). In the IC card R/W apparatus 5', the communication control unit 53 determines whether the received R/W command is an operation mode command, an application command, a R/W control command or a pass-through command according to the R/W command identifier 14 in the received R/W command (Steps S23 through S26).

In a first case, the received R/W command is an operation mode command (if a decision at Step S23 is YES). In this case, the operation mode control unit 57 further determines whether the operation mode command is an application mode set command, a pass-through mode set command or a mode clear command (Steps S27 through S29).

If the received R/W command (the operation mode command) is an application mode set command (if a decision at Step S27 is YES), the application mode is set (Step S30). If the received R/W command is a pass-through mode set command (a decision at Step S27 is NO and at Step S28 is YES), the pass-through mode is set (Step S31). If the received R/W command is a mode clear command (if decisions at Steps S27 and S28 are NO and at Step S29 is YES), the mode currently set (held) is cleared (Step S32).

If the received R/W command (the application command) is neither an application mode set command nor a pass-through mode set command nor a mode clear command (if decisions at Steps S27 through S29 are all NO), the operation mode control unit 57 generates an error response (Step S33). The communication control unit 53 transmits the error response to the personal computer 6 (Step S42).

If the received R/W command is an application command (a decision at Step S23 is NO and at Step S24 is YES), the application unit 54 determines whether the operation mode currently set is the application mode (the AP mode) or not (Step S34). If the application mode has been set (if a decision at Step S34 is YES), the mechanism control unit 56 controls the mechanism unit 52 to fetch the IC card 4.

After that, the application unit 54 performs an application process such as a reading process, an editing process or the like on card data of the IC card 4. The mechanism control unit 56 then controls the mechanism unit 52 to discharge the IC card 4 (Steps S35 through S37). The communication control unit 53 transmits a response to the personal computer 6 (Step S42).

If the application mode has not been set when the application command is received (if a decision at Step S34 is NO), the application unit 54 generates an error response (Step S38), and transmits it to the personal computer 7 (Step S42).

If the R/W command received from the personal computer 6 is a R/W control command (if decisions at Steps S23 and S24 are NO and at Step S25 is YES), the mechanism control unit 56 controls the mechanism unit 52 to perform only the inserting/discharging process on the IC card 4 (Steps S36 and S37). Then a response to the R/W control command is transmitted to the personal computer 6 by the communication control unit 53 (Step S42).

If the R/W command received from the personal computer 6 is a pass-through command (if decisions at Steps S23 through S25 are NO and at Step S26 is YES), the pass-through function unit 55 determines whether the operation mode currently set is the pass-through mode or not (step S38'). If the pass-through mode is set (if a decision at Step S38' is YES), the pass-through function unit 55 converts the communication protocol of the received R/W command (the pass-through command including the card command) adaptive to the IC card 4 and transmits the R/W command to the IC card 4. Then the pass-through function unit 55 converts the communication protocol of the response to this card command adaptive to the personal computer 6 (Step S39) and transmits the response to the personal computer 6 (Step S42), as described before with reference to FIG. 6.

If the operation mode currently set is not the pass-through mode when the pass-through command is received (if a decision at Step S38' is NO), the pass-through function unit 55 generates an error response (Step S40). The error response is transmitted to the personal computer 6 (step S42).

If the R/W command received from the personal computer 6 is neither an operation mode command nor an application mode command nor a R/W control command nor a pass-through command (if decisions at Steps S23 through S26 are NO), the communication control unit 53 generates an error response (Step S41). Then this error response is transmitted to the personal computer 6 (Step S42).

According to the IC card system of this embodiment, it is possible to make the IC card R/W apparatus 5' be in a state of the application mode (the intelligent function) or the pass-through mode (the pass-through function). The mode is selected according to the operation mode command from the personal computer 6. The IC card R/W apparatus 5' therefore may be used as an R/W apparatus operative in a desired mode by designating it once using the operation mode command. This eliminates the necessity of designating each time the intelligent function or the pass-through function using a command from the personal computer 6.

In this case, this embodiment contributes to a reduction in cost required to configure the system and to flexibility of the system. In particular, this embodiment is very effective if it is known beforehand that the IC card R/W apparatus 5' will be used as an apparatus having either the intelligent function or the pass-through function.

When receiving the operation mode command from the personal computer 6, the above-mentioned IC card R/W apparatus 5' holds an operation mode set by the operation mode command. When receiving the mode clear command (an operation mode release command) from the personal computer 6, the IC card R/W apparatus 5' can clear (release) the held operation mode. In consequence, it is possible at any time to alter the use of the IC card R/W apparatus 5' into an apparatus with the intelligent function or an apparatus with the pass-through function, even after the system has been built.

If another IC card R/W apparatus in the system fails, for example, it is possible to use the IC card R/W apparatus 5' as a substitute for the failed IC card R/W apparatus in an extremely simple procedure. This feature largely contributes to reliability of the system.

Further, the above-mentioned IC card R/W apparatus 5' rejects commands except for a command corresponding to an operation mode held as a mode set by the operation mode command from the personal computer 6, as described hereinbefore at Step S38 or Step S40 in FIG. 12. Accordingly, it does not happen that the IC card R/W apparatus 5' is abruptly shifted into another operation mode while the IC card R/W apparatus 5' is in an operation. The IC card R/W apparatus 5' therefore can certainly and stably continue a process in an operation mode that the IC card R/W apparatus 5' holds.

In the above-mentioned IC card system, a procedure is established until the application command, the pass-through command or the like is issued. Therefore, the upper personal computer 6 can always recognize an issued command, whereby security of the IC card system may be improved.

In the above-mentioned IC card R/W apparatus 5', is possible that an operation mode that has a priority is set in advance. A command corresponding to the pre-set priority mode is thereby operable irrespective of an operation mode currently set.

Suppose, for example, that an operation mode set in advance as a priority mode is set as the application mode (the intelligent function). In this case, the application process by the application unit 54 is preferentially implemented (Step S35) without a determining process as described at Step S34 in FIG. 12 (a process to determine whether an operation mode currently set is the application mode or not) if the R/W command from the personal computer 6 is an application command (if a decision at Step S24 is NO).

Incidentally, other processes are implemented similarly to the processes described with reference to FIG. 12. If an operation mode that has a priority is set in advance to the pass-through mode (the pass-through function), the pass-through process by the pass-through function unit 55 is preferentially executed without a determining process as described at Step S38 in FIG. 12 (a process of determining whether an operation mode currently set is the pass-through mode or not).

In this case, when the IC card R/W apparatus 5' accepts a command corresponding to an operation mode set in advance as a priority mode, the IC card R/W apparatus 5' may be brought to a state where either the intelligent function or the pass-through function that has a priority is selected, even if the operation mode command is not received. If it is known beforehand that the IC card R/W apparatus 5' will be used as an apparatus having either the intelligent function or the pass-through function, for example, it is possible to provide quite efficiently the IC card R/W apparatus 5' having a function suitable for a purpose of the use. As a result, the facility of the IC card R/W apparatus 5' in relation with the upper-personal computer 6 (the host system s) may be improved.

A method of setting a prior operation mode is not particularly preferred. However, there would be possible a method in which the priority operation mode is set in advance by means of an outer setting function of the intelligent-type IC card R/W apparatus 5'. Alternatively, a method is possible in which the priority operation mode is fixedly set in the intelligent-type IC card R/W apparatus 5'.

What is claimed is:

1. An IC card reading/writing apparatus comprising an IC card reading/writing control unit having:

an intelligent function unit to control read-out/write-in processing for an IC card by an application unit in said IC card reading/writing apparatus;

a pass-through function unit to control read-out/write-in processing for said IC card by an application unit in a host for said IC card reading/writing apparatus by receiving a pass-through command from the host; and a communication control unit to determine a type of a read-out/write-in command directing the read-out/write-in processing for the IC card from the host and to control processing in the IC card reading/writing control unit according to the type determined thereby;

wherein when the communication control unit determines that the read-in/write-out command is an application command, said IC card reading/writing control unit activates the intelligent function unit to transmit a card command generated by the intelligent function unit to the IC card, to fetch data from the IC card, and to perform an application process; and wherein when the communication control unit determines that the read-in/write-out command is a pass-through command, said IC card reading/writing control unit activates the pass-through function unit to convert the pass-through command to a communication protocol for the IC card, to send the converted pass-through command to the IC card, to convert a response to the converted pass-through command to a communication protocol for the host, to send the converted response to the host, and to fetch data from the IC card to perform a pass-through process.

2. An IC card reading/writing apparatus comprising an IC card reading/writing control unit having:

an intelligent function unit to control read-out/write-in processing for an IC card by an application unit in said IC card reading/writing apparatus;

a pass-through function unit to control read-out/write-in processing for the IC card by an application unit in a host for said IC card reading/writing apparatus by receiving a pass-through command from the host; and an operation mode control unit that sets said IC card reading/writing apparatus into one of an intelligent function mode and a pass-through function mode according to an operation mode command received from the host;

wherein the operation mode control unit holds an operation mode setting in response to the operation mode command received from the host, rejects a command from the host when the command does not correspond to the operation mode setting, and clears the held operation mode setting when an operation mode clear command is received from the host.

3. The IC card reading/writing apparatus according to claim 2, wherein the operation mode control unit sets said IC card reading/writing apparatus into a priority mode selected in advance from the intelligent function mode and the pass-through function mode according to a setting command indicating a priority mode to select when an operation mode command is not received.

4. An IC card system comprising:

an IC card;

an intelligent IC card reading/writing apparatus to execute read-out/write-in processing for said IC card by an application unit in said IC card reading/writing apparatus; and a host for said IC card reading/writing apparatus, said host capable of sending a pass-through command to said IC card reading/writing apparatus;

said IC card reading/writing apparatus including an IC card reading/writing control unit having an intelligent function unit to control read-out/write-in processing for said IC card by the application unit in said IC card reading/writing apparatus, a pass-through function unit to control read-out/write-in processing for said IC card by an application unit in said host when receiving a pass-through command from said host, and a communication control unit to determine a type of a read-out/write-in command directing the read-out/write-in processing for said IC card from said host and to control the processing in the IC card reading/writing control unit according to the type determined thereby;

wherein when the communication control unit determines that the read-in/write-out command is an application command, the IC card reading/writing control unit activates the intelligent function unit to transmit a card command generated by the intelligent function unit to said IC card, to fetch data from said IC card, and to perform an application process; and wherein when the communication control unit determines that the read-in/write-out command is a pass-through command, the IC card reading/writing control unit activates the pass-through function unit to convert the pass-through command to a communication protocol for said IC card, to send the converted pass-through command to said IC card, to convert a response to the converted pass-through command to a communication protocol for said host, to send the converted response to said host, and to fetch data in said IC card to perform a pass-through process.

5. An IC card system comprising:

an IC card;

an intelligent IC card reading/writing apparatus to execute read-out/write-in processing for said IC card by an application unit in said IC card reading/writing apparatus; and a host for said IC card reading/writing apparatus, said host capable of sending a pass-through command to said IC card reading/writing apparatus;

said IC card reading/writing apparatus including an IC card reading/writing control unit having an intelligent function unit to control read-out/write-in processing for said IC card by the application unit in said IC card reading/writing apparatus, a pass-through function unit to control read-out/write-in processing for said IC card by an application unit of said host by receiving a pass-through command from said host, and an operation mode control unit that sets said IC card reading/writing apparatus into a priority mode selected in advance from an intelligent function mode and a pass-through function mode according to a setting command indicating a priority mode to select when an operation mode command is not received;

wherein the operation mode control unit holds an operation mode setting in response to an operation mode command received from said host, rejects a command from said host when the command does not correspond to the operation mode setting, and clears the held operation mode setting when an operation mode clear command is received from said host.

* * * * *